US012699556B2

(12) United States Patent
Guttridge et al.

(10) Patent No.: US 12,699,556 B2
(45) Date of Patent: Aug. 4, 2026

(54) SOFTWARE LIBRARY USAGE OPTIMIZATION

(71) Applicant: The Toronto-Dominion Bank, Toronto (CA)

(72) Inventors: Francis James Alexander Guttridge, Vaughan (CA); Dino Paul D'Agostino, Richmond Hill (CA); A Warren Pratten, London (CA); Shahzad Mohammed, Toronto (CA); Arvind Chikkalavalasa, Milton (CA); Waqas Nawaz, Waterdown (CA)

(73) Assignee: The Toronto-Dominion Bank, Toronto (CA)

( * ) Notice: Subject to any disclaimer, the term of this patent is extended or adjusted under 35 U.S.C. 154(b) by 127 days.

(21) Appl. No.: 18/458,926

(22) Filed: Aug. 30, 2023

(65) Prior Publication Data

US 2025/0077204 A1 Mar. 6, 2025

(51) Int. Cl.
*G06F 8/41* (2018.01)
*G06F 8/75* (2018.01)

(52) U.S. Cl.
CPC .............. *G06F 8/4435* (2013.01); *G06F 8/75* (2013.01)

(58) Field of Classification Search
CPC ............. G06F 8/4435; G06F 8/75; G06F 8/36
See application file for complete search history.

(56) References Cited

U.S. PATENT DOCUMENTS

| | | |
|---|---|---|
| 7,120,643 B2 | 10/2006 | Dill |
| 7,222,138 B2 | 5/2007 | Fomenko |
| 7,376,645 B2 | 5/2008 | Bernard |
| 7,716,254 B2 | 5/2010 | Sarkar et al. |
| 7,880,749 B2 | 2/2011 | Favart et al. |
| 8,775,462 B2 | 7/2014 | Coldicott et al. |
| 8,793,151 B2 | 7/2014 | DelZoppo et al. |
| 9,262,134 B2 | 2/2016 | Kelapure et al. |
| 9,342,279 B2 | 5/2016 | Zhang et al. |
| 9,372,669 B2 | 6/2016 | Jalaldeen et al. |
| 9,389,851 B1 | 7/2016 | Nelson et al. |

(Continued)

FOREIGN PATENT DOCUMENTS

CN 107678777 A 2/2018

OTHER PUBLICATIONS

Heglin et al., "Auto-Adjudication Process Via Machine Learning," U.S. Appl. No. 19/053,942, filed Feb. 14, 2025.

(Continued)

*Primary Examiner* — Marina Lee

(57) ABSTRACT

An example operation may include one or more of training a generative artificial intelligence (GenAI) model based on execution of the GenAI model on software libraries and descriptions of intent of the software libraries, receiving a first set of software libraries and a second set of software libraries, identifying a first software library within the first set of software libraries that includes redundant functionality with a second software library within the second set of software libraries based on execution of a generative artificial intelligence (GenAI) model on the first and second sets of libraries, and displaying an identifier of the first and second software libraries via a user interface. The example operation may further include an AI agent that performs an action based on the identifier.

20 Claims, 16 Drawing Sheets

710

(56) References Cited

U.S. PATENT DOCUMENTS

| | | | |
|---|---|---|---|
| 9,477,444 B1 | 10/2016 | Shen et al. | |
| 9,519,464 B2 | 12/2016 | Dang et al. | |
| 9,864,982 B2 | 1/2018 | Bristow et al. | |
| 10,163,085 B2 | 12/2018 | D'Agostino et al. | |
| 10,178,246 B1 | 1/2019 | Horvath et al. | |
| 10,181,114 B2 | 1/2019 | Tseretopoulos et al. | |
| 10,289,615 B2 | 5/2019 | Nijor et al. | |
| 10,303,533 B1 | 5/2019 | Panov et al. | |
| 10,339,931 B2 | 7/2019 | Tseretopoulos et al. | |
| 10,346,824 B2 | 7/2019 | Chan et al. | |
| 10,360,303 B2 | 7/2019 | Volkovs et al. | |
| 10,379,994 B1 | 8/2019 | Giles et al. | |
| 10,405,146 B1 | 9/2019 | Kuruvilla et al. | |
| 10,437,565 B2 | 10/2019 | Hao et al. | |
| 10,438,206 B2 | 10/2019 | Jivraj et al. | |
| 10,440,196 B2 | 10/2019 | Horvath et al. | |
| 10,440,197 B2 | 10/2019 | Horvath et al. | |
| 10,460,748 B2 | 10/2019 | Tseretopoulos et al. | |
| 10,482,675 B1 | 11/2019 | Sutter et al. | |
| 10,503,486 B2 | 12/2019 | Dimitrov et al. | |
| 10,572,473 B2 | 2/2020 | Allen et al. | |
| 10,659,400 B2 | 5/2020 | Moon et al. | |
| 10,698,902 B2 | 6/2020 | Tseretopoulos et al. | |
| 10,706,635 B2 | 7/2020 | Sutter et al. | |
| 10,708,721 B2 | 7/2020 | Kuruvilla et al. | |
| 10,728,259 B2 | 7/2020 | McCarter et al. | |
| 10,756,982 B2 | 8/2020 | Bai | |
| 10,776,619 B2 | 9/2020 | Collinson et al. | |
| 10,817,264 B1 | 10/2020 | Goodsitt et al. | |
| 10,824,941 B2 | 11/2020 | Volkovs et al. | |
| 10,831,923 B2 | 11/2020 | Dunjic et al. | |
| 10,832,047 B2 | 11/2020 | Moghtadai | |
| 10,862,897 B2 | 12/2020 | D'Agostino et al. | |
| 10,867,292 B2 | 12/2020 | Lin et al. | |
| 10,867,293 B2 | 12/2020 | Bristow et al. | |
| 10,878,816 B2 | 12/2020 | Tseretopoulos et al. | |
| 10,902,220 B2 | 1/2021 | Lozon et al. | |
| 10,922,665 B2 | 2/2021 | Miller et al. | |
| 10,943,605 B2 | 3/2021 | Tseretopoulos et al. | |
| 10,949,337 B1 | 3/2021 | Yalla et al. | |
| 10,956,127 B2 | 3/2021 | Welp et al. | |
| 10,977,617 B2 | 4/2021 | Tseretopoulos et al. | |
| 10,983,761 B2 | 4/2021 | Svyatkovskiy et al. | |
| 10,997,227 B2 | 5/2021 | Agrawal et al. | |
| 11,004,187 B2 | 5/2021 | Kuruvilla et al. | |
| 11,017,028 B2 | 5/2021 | Dunjic et al. | |
| 11,017,156 B2 | 5/2021 | Hwang | |
| 11,023,689 B1 | 6/2021 | Sippel et al. | |
| 11,030,068 B1 | 6/2021 | Agarwal et al. | |
| 11,030,415 B2 | 6/2021 | Volkovs et al. | |
| 11,055,924 B2 | 7/2021 | Navarro et al. | |
| 11,061,638 B2 | 7/2021 | Lam | |
| 11,070,448 B2 | 7/2021 | Miller et al. | |
| 11,086,859 B2 | 8/2021 | Nijor et al. | |
| 11,087,314 B2 | 8/2021 | Gandhi et al. | |
| 11,100,168 B2 | 8/2021 | Miller et al. | |
| 11,140,143 B2 | 10/2021 | Moon et al. | |
| 11,144,921 B2 | 10/2021 | Dunjic et al. | |
| 11,144,998 B2 | 10/2021 | Kuruvilla et al. | |
| 11,145,169 B2 | 10/2021 | Pratten et al. | |
| 11,150,877 B2 * | 10/2021 | Ivankovic | G06N 20/00 |
| 11,182,860 B2 | 11/2021 | Kuruvilla et al. | |
| 11,194,688 B1 | 12/2021 | Featonby et al. | |
| 11,200,328 B2 | 12/2021 | Shpurov et al. | |
| 11,200,411 B2 | 12/2021 | Rizvi et al. | |
| 11,210,857 B2 | 12/2021 | Rizvi et al. | |
| 11,222,286 B2 | 1/2022 | Choe et al. | |
| 11,232,304 B2 | 1/2022 | Navarro et al. | |
| 11,237,802 B1 | 2/2022 | Krishnamoorthy et al. | |
| 11,238,377 B2 | 2/2022 | Polleri et al. | |
| 11,250,063 B2 | 2/2022 | Krasadakis | |
| 11,270,206 B2 | 3/2022 | Kursun | |
| 11,276,257 B2 | 3/2022 | Moghtadai et al. | |
| 11,301,245 B2 | 4/2022 | DeLuca et al. | |
| 11,303,642 B2 | 4/2022 | Dunjic et al. | |
| 11,314,620 B1 | 4/2022 | Lin et al. | |
| 11,334,574 B2 | 5/2022 | Caputo et al. | |
| 11,347,744 B2 | 5/2022 | Tseretopoulos et al. | |
| 11,349,871 B2 | 5/2022 | Moon et al. | |
| 11,354,442 B2 | 6/2022 | Haldenby et al. | |
| 11,361,566 B2 | 6/2022 | Collinson et al. | |
| 11,373,229 B2 | 6/2022 | Tseretopoulos et al. | |
| 11,385,892 B1 | 7/2022 | Zhang | |
| 11,392,776 B2 | 7/2022 | Lozon et al. | |
| 11,393,020 B2 | 7/2022 | Mathew et al. | |
| 11,394,668 B1 | 7/2022 | Subbunarayanan et al. | |
| 11,397,765 B2 | 7/2022 | Volkovs et al. | |
| 11,409,811 B2 | 8/2022 | D'Agostino | |
| 11,411,734 B2 | 8/2022 | Shpurov et al. | |
| 11,416,245 B2 | 8/2022 | Irvin et al. | |
| 11,429,360 B1 | 8/2022 | Agarwal et al. | |
| 11,430,242 B2 | 8/2022 | Moghtadai | |
| 11,436,809 B2 | 9/2022 | Rizvi et al. | |
| 11,443,082 B2 | 9/2022 | Janarthanam et al. | |
| 11,451,669 B1 | 9/2022 | Navarro et al. | |
| 11,469,878 B2 | 10/2022 | Shpurov et al. | |
| 11,470,091 B2 | 10/2022 | McCarter et al. | |
| 11,470,143 B2 | 10/2022 | Joheb et al. | |
| 11,475,059 B2 | 10/2022 | Liu et al. | |
| 11,475,251 B2 | 10/2022 | Morin et al. | |
| 11,477,265 B2 | 10/2022 | McPhee et al. | |
| 11,507,622 B2 | 11/2022 | Grebenisan et al. | |
| 11,507,868 B2 | 11/2022 | Kwong et al. | |
| 11,537,492 B1 | 12/2022 | Agarwal et al. | |
| 11,546,345 B2 | 1/2023 | D'Agostino et al. | |
| 11,550,652 B1 | 1/2023 | Arora et al. | |
| 11,579,868 B1 * | 2/2023 | Zhang | G06F 8/72 |
| 11,580,762 B2 | 2/2023 | Rizvi et al. | |
| 11,586,491 B2 | 2/2023 | Banerjee et al. | |
| 11,593,461 B2 | 2/2023 | Polisetty et al. | |
| 11,599,444 B2 | 3/2023 | Lin et al. | |
| 11,600,064 B2 | 3/2023 | Navarro et al. | |
| 11,604,899 B2 | 3/2023 | Haldenby et al. | |
| 11,620,741 B2 | 4/2023 | Kuruvilla et al. | |
| 11,632,311 B2 | 4/2023 | Miller et al. | |
| 11,651,100 B2 | 5/2023 | Dunjic et al. | |
| 11,663,488 B2 | 5/2023 | Volkovs et al. | |
| 11,669,436 B2 | 6/2023 | Ingram | |
| 11,671,536 B2 | 6/2023 | Navarro et al. | |
| 11,675,654 B2 | 6/2023 | Pudipeddi et al. | |
| 11,676,016 B2 | 6/2023 | Baijal et al. | |
| 11,681,541 B2 * | 6/2023 | Mostafa | G06F 9/45529 717/106 |
| 11,687,995 B2 | 6/2023 | Tseretopoulos et al. | |
| 11,689,484 B2 | 6/2023 | Moon et al. | |
| 11,693,632 B2 | 7/2023 | Latapie et al. | |
| 11,704,782 B2 | 7/2023 | Wakim et al. | |
| 11,741,305 B2 | 8/2023 | Skaljin et al. | |
| 11,743,210 B2 | 8/2023 | Moon et al. | |
| 11,748,400 B2 | 9/2023 | Volkovs et al. | |
| 11,748,555 B2 | 9/2023 | Tran | |
| 11,756,388 B2 | 9/2023 | Pratten et al. | |
| 11,777,918 B2 | 10/2023 | Moon et al. | |
| 11,782,935 B2 | 10/2023 | Caputo et al. | |
| 11,789,909 B2 | 10/2023 | Grebenisan et al. | |
| 11,790,012 B2 | 10/2023 | D'Agostino | |
| 11,790,354 B2 | 10/2023 | Gandhi et al. | |
| 11,797,962 B2 | 10/2023 | Jones et al. | |
| 11,809,486 B2 | 11/2023 | Liu et al. | |
| 11,809,577 B2 | 11/2023 | Begg et al. | |
| 11,811,826 B2 | 11/2023 | Moon et al. | |
| 11,816,474 B1 | 11/2023 | Zafar et al. | |
| 11,830,463 B1 | 11/2023 | Kurek et al. | |
| 11,842,252 B2 | 12/2023 | Kuang et al. | |
| 11,868,672 B1 | 1/2024 | Dehkordi et al. | |
| 11,875,398 B2 | 1/2024 | Pratten et al. | |
| 11,880,811 B2 | 1/2024 | Pawelkiewicz et al. | |
| 11,886,764 B2 | 1/2024 | Lam | |
| 11,928,112 B2 | 3/2024 | Dunjic et al. | |
| 11,941,378 B1 | 3/2024 | Adler et al. | |
| 11,941,525 B2 | 3/2024 | Morin et al. | |
| 11,941,703 B2 | 3/2024 | Kuruvilla et al. | |
| 11,955,117 B2 | 4/2024 | McDermid et al. | |
| 11,960,867 B1 | 4/2024 | Singh et al. | |

(56) References Cited

U.S. PATENT DOCUMENTS

| | | |
|---|---|---|
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,158,929 B1 | 12/2024 | Huang et al. |
| 12,164,542 B1 | 12/2024 | Rahman et al. |
| 12,164,751 B1 | 12/2024 | Harper et al. |
| 12,169,693 B2 | 12/2024 | Lu |
| 12,174,734 B2 | 12/2024 | Ziegler et al. |
| 12,175,220 B2 | 12/2024 | Sundaresan et al. |
| 12,182,263 B2 | 12/2024 | Sinn et al. |
| 12,182,678 B1 | 12/2024 | Poulis et al. |
| 12,182,800 B2 | 12/2024 | Navarro et al. |
| 12,198,109 B2 | 1/2025 | Abbas |
| 12,198,510 B2 | 1/2025 | Pratten et al. |
| 12,204,323 B1 | 1/2025 | Malviya et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,456 B1 | 2/2025 | Manohar et al. |
| 12,223,549 B2 | 2/2025 | Bouëtté et al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 12,393,405 B1 * | 8/2025 | Mandal ............... G06F 11/3684 |
| 2007/0061354 A1 | 3/2007 | Sarkar et al. |
| 2007/0198461 A1 | 8/2007 | Glomann |
| 2009/0064205 A1 | 3/2009 | Fay et al. |
| 2015/0082272 A1 | 3/2015 | Jalaldeen et al. |
| 2018/0150378 A1 | 5/2018 | Gopalswamy et al. |
| 2018/0268818 A1 | 9/2018 | Schoenmackers et al. |
| 2018/0349105 A1 * | 12/2018 | Makkar ..................... G06F 8/33 |
| 2019/0172045 A1 | 6/2019 | Dunjic et al. |
| 2019/0272171 A1 * | 9/2019 | Chen ......................... G06F 8/75 |
| 2019/0303107 A1 | 10/2019 | Kelly |
| 2020/0058068 A1 | 2/2020 | Gandhi et al. |
| 2020/0159643 A1 | 5/2020 | Wang et al. |
| 2020/0159934 A1 | 5/2020 | Yamaguchi et al. |
| 2020/0371778 A1 | 11/2020 | Ni et al. |
| 2021/0026605 A1 | 1/2021 | Evangelopoulos et al. |
| 2021/0027160 A1 | 1/2021 | Volkovs et al. |
| 2021/0034342 A1 | 2/2021 | Hoy |
| 2021/0037040 A1 | 2/2021 | Aleks et al. |
| 2021/0049007 A1 | 2/2021 | Nelluri et al. |
| 2021/0056007 A1 | 2/2021 | Viswanathan et al. |
| 2021/0117893 A1 | 4/2021 | Sohum et al. |
| 2021/0132915 A1 * | 5/2021 | Ivankovic .............. G06N 20/00 |
| 2021/0232950 A1 | 7/2021 | Kono |
| 2021/0264461 A1 | 8/2021 | Fam |
| 2021/0334096 A1 | 10/2021 | DeLuca et al. |
| 2021/0334700 A1 | 10/2021 | Nagaraja |
| 2021/0374304 A1 | 12/2021 | Janarthanam et al. |
| 2021/0390656 A1 | 12/2021 | Krishnamoorthy |
| 2021/0407016 A1 | 12/2021 | Kuruvilla et al. |
| 2022/0035856 A1 | 2/2022 | Gilder et al. |
| 2022/0058489 A1 | 2/2022 | Volkovs et al. |
| 2022/0107980 A1 | 4/2022 | Lisuk et al. |
| 2022/0108069 A1 | 4/2022 | Lee |
| 2022/0157094 A1 | 5/2022 | Moghtadai et al. |
| 2022/0164626 A1 | 5/2022 | Bird et al. |
| 2022/0164672 A1 | 5/2022 | Bird et al. |
| 2022/0172083 A1 | 6/2022 | Wu et al. |
| 2022/0188079 A1 | 6/2022 | Kohisseri et al. |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0309573 A1 | 9/2022 | Mathew et al. |
| 2022/0318500 A1 | 10/2022 | Prasad et al. |
| 2022/0318573 A1 | 10/2022 | Smith et al. |
| 2022/0318617 A1 | 10/2022 | Wong et al. |
| 2022/0318682 A1 | 10/2022 | Sawaf et al. |
| 2022/0318683 A1 | 10/2022 | Sawaf et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | McPhee et al. |
| 2023/0011451 A1 | 1/2023 | Lu |
| 2023/0034984 A1 * | 2/2023 | Ravindranath ........... G06F 8/51 |
| 2023/0048437 A1 | 2/2023 | Karbasi et al. |
| 2023/0083899 A1 | 3/2023 | Gandouet et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0161561 A1 | 5/2023 | Ghosh et al. |
| 2023/0185550 A1 * | 6/2023 | Saphal .................. G06F 8/4435 717/144 |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267034 A1 | 8/2023 | Arumugam et al. |
| 2023/0267367 A1 | 8/2023 | Volkovs et al. |
| 2023/0267475 A1 | 8/2023 | Navarro et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0360388 A1 | 11/2023 | Singh |
| 2023/0368048 A1 | 11/2023 | Yang et al. |

(56) References Cited

U.S. PATENT DOCUMENTS

| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0069871 A1 | 2/2024 | Mohanty et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0176808 A1 | 5/2024 | Das et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281219 A1 | 8/2024 | Masad et al. |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0362209 A1 | 10/2024 | Almaer et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403623 A1 | 12/2024 | Mohamed Halim et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419575 A1 | 12/2024 | Hawker |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0424405 A1 | 12/2024 | Rao et al. |
| 2024/0427564 A1 | 12/2024 | Petrov et al. |
| 2024/0427566 A1 | 12/2024 | Lin et al. |
| 2024/0428283 A1 | 12/2024 | Belbahri et al. |
| 2024/0430363 A1 | 12/2024 | Neate et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0021309 A1 | 1/2025 | Schmidt et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045028 A1 | 2/2025 | Sikand et al. |
| 2025/0045048 A1 | 2/2025 | Dey et al. |
| 2025/0045530 A1 | 2/2025 | Reddy et al. |
| 2025/0045601 A1 | 2/2025 | Zuberi et al. |
| 2025/0053387 A1 | 2/2025 | Wang et al. |
| 2025/0053799 A1 | 2/2025 | Rastogi et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1* | 3/2025 | Guttridge ................. G06F 8/20 |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëtté et al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |

(56) References Cited

U.S. PATENT DOCUMENTS

| | | |
|---|---|---|
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

OTHER PUBLICATIONS

Heidrich et al, "Visualizing Source Code as Comics Using Generative AI", IEEE, pp. 1-5 (Year: 2023).

Santos et al, "Impacts of the Usage of Generative Artificial Intelligence on Software Development Process", ACM, pp. 1-9 (Year: 2024).

Arun, "A Software Architectural Model for Generative Artificial Intelligence with Reinforcement Learning", IEEE, pp. 1-6 (Year: 2024).

He et al, "Securing Federated Diffusion Model With Dynamic Quantization for Generative AI Services in Multiple-Access Artificial Intelligence of Things", IEEE, pp. 1-14 (Year: 2024).

Zhang et al, "Application Research on Artificial Intelligence Generated Content in Architectural Design", ACM, pp. 1-10 (Year: 2024).

Adebayo et al., "Automated Compliance Blueprint Optimization with Artificial Intelligence", 2022, arXiv, 5 pages. (Year: 2022).

Banus et al., "Design and Deployment of a Generic Software for Managing Industrial Vision Systems", IEEE Transactions on Automation Science and Engineering, pp. 2171-2184, Jul. 2022. https://ieeexplore.ieee.org/stamp/stamp.jsp?tp=&amumber-9445397 (Year: 2022).

Bao et al., "Software Architecture for Responsible Artificial Intelligence Systems: Practice in the Digitization of Industrial Drawings," IEEE Xplore, pp. 38-49, (2023) https://ieeexplore. ieee.org/stamp/stamp.jsp?tp=&amumber=10098222.

Ivers et al., "Can AI Close the Design-Code Abstraction Gap?", 2019, IEEE, pp. 122-125. (Year: 2019).

Nassif et al., "Neural network models for software development effort estimation: a comparative study", 2016, Springer, pp. 2369-2381. (Year: 2016).

Qiang Tu et al.; The Build-Time Software Architecture View; IEEE; 10 pages; retrieve on Sep. 29, 2025 (Year: 2025).

Schumacher et al., "Improving Code Recommendations by Combining Neural and Classical Machine Learning Approaches", 2020, ACM, pp. 476-482. (Year: 2020).

Stanislaw Jerzy Niepostyn, Entropy as a Measure of Consistency in Software Architecture, 2023, pp. 1-21. https://www.mdpi.com/1099-4300/25/2/328 (Year: 2023).

Rakhmetova et al., "Conceptual Modelling of Log Files: From a UML-based Design to JSON Files", Technical Report University of Verona, 2021, in press.

* cited by examiner

700                        FIG. 7A
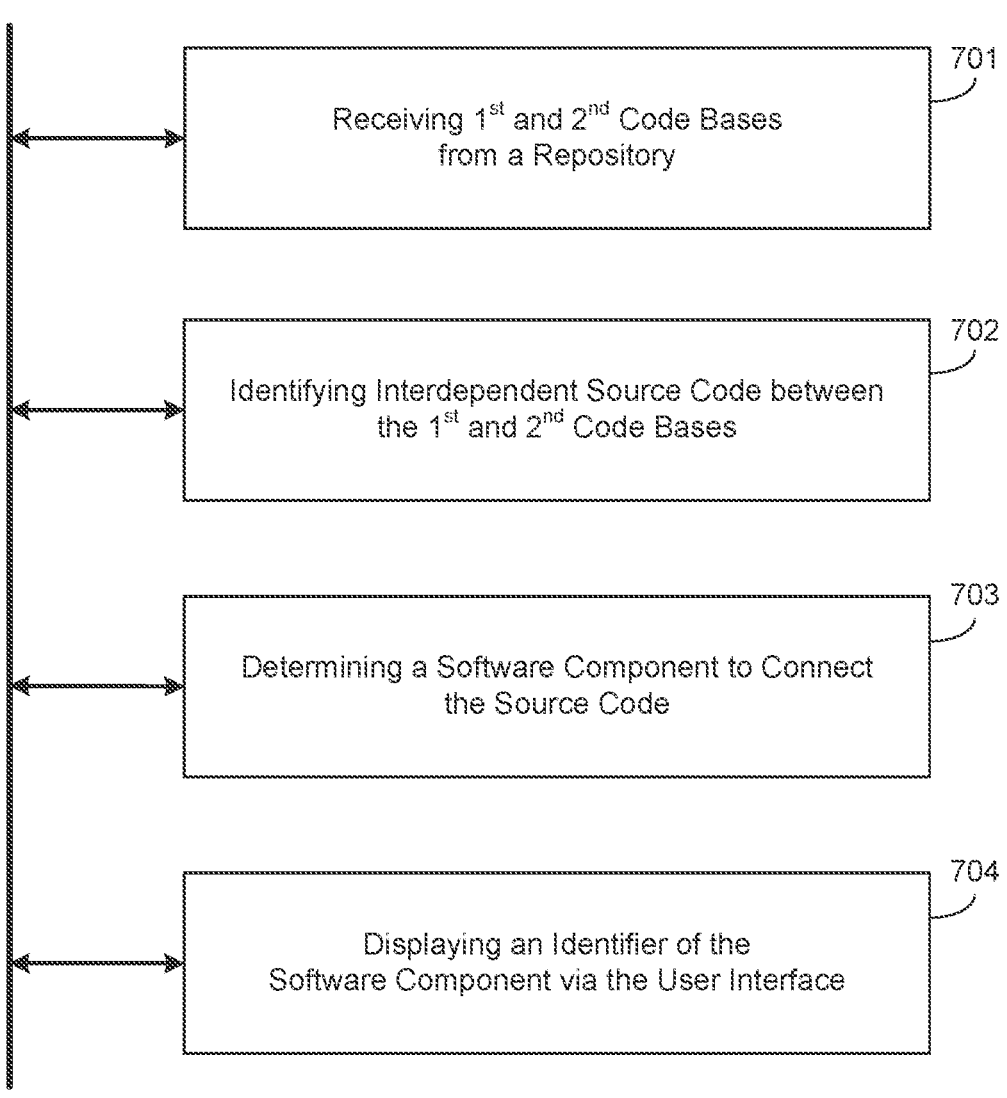

710                    FIG. 7B
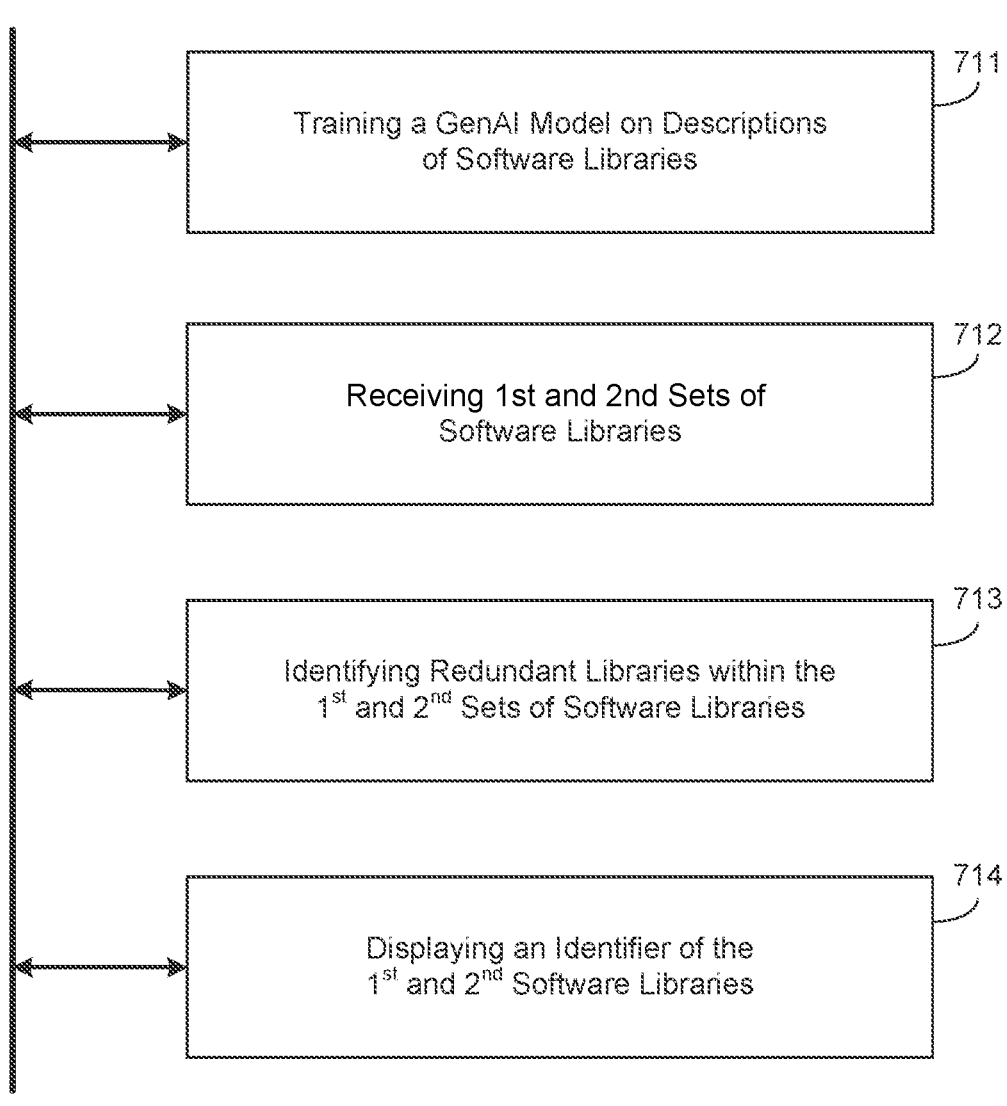
711
Training a GenAI Model on Descriptions
of Software Libraries
712
Receiving 1st and 2nd Sets of
Software Libraries
713
Identifying Redundant Libraries within the
1$^{st}$ and 2$^{nd}$ Sets of Software Libraries
714
Displaying an Identifier of the
1$^{st}$ and 2$^{nd}$ Software Libraries

800

SOFTWARE LIBRARY USAGE OPTIMIZATION

BACKGROUND

For large companies and organizations, the number of software developers and architects can be in the dozens, hundreds, and even thousands. These designers often work inside a siloed environment in which they focus on a particular application, module, etc., of the software without much awareness of the work of the other designers within their organization outside of the particular siloed environment. For example, a first software developer may develop code for an email software system while a second developer architect may develop code for a data processing pipeline. In this example, both developers may develop similar APIs to interact with a similar external data source, such as a cloud database. However, due to their different siloed environments within the organization, the developers may be unaware of the existence of the others' work.

SUMMARY

One example embodiment provides an apparatus that may include a processor configured to receive a first code base and a second code base from a software repository, wherein each of the first and second code bases comprises source code of a plurality of different software programs, identify a source code within the first code base that is interdependent with a source code within the second code base based on execution of a generative artificial intelligence (GenAI) model on the first and second code bases, determine a software component to connect the source code within the first code base to the source code within the second code based, and display an identifier of the software component via a user interface.

Another example embodiment provides a method that includes one or more of receiving a first code base and a second code base from a software repository, wherein each of the first and second code bases comprise source code of a plurality of different software programs, identifying a source code within the first code base that is interdependent with a source code within the second code base based on execution of a generative artificial intelligence (GenAI) model on the first and second code bases, determining a software component to connect the source code within the first code base to the source code within the second code base, and displaying an identifier of the software component via a user interface.

A further example embodiment provides a computer-readable medium comprising instructions, that when read by a processor, cause the processor to perform one or more of receiving a first code base and a second code base from a software repository, wherein each of the first and second code bases comprise source code of a plurality of different software programs, identifying a source code within the first code base that is interdependent with a source code within the second code base based on execution of a generative artificial intelligence (GenAI) model on the first and second code bases, determining a software component to connect the source code within the first code base to the source code within the second code base, and displaying an identifier of the software component via a user interface.

A further example embodiment provides an apparatus that may include a processor configured to train a generative artificial intelligence (GenAI) model based on execution of the GenAI model on software libraries and descriptions of intent of the software libraries, receive a first set of software libraries and a second set of software libraries, identify a first software library within the first set of software libraries that includes redundant functionality with a second software library within the second set of software libraries based on execution of a generative artificial intelligence (GenAI) model on the first and second sets of libraries, and display an identifier of the first and second software libraries via a user interface.

A further example embodiment provides a method that includes one or more of training a generative artificial intelligence (GenAI) model based on execution of the GenAI model on software libraries and descriptions of intent of the software libraries, receiving a first set of software libraries and a second set of software libraries, identifying a first software library within the first set of software libraries that includes redundant functionality with a second software library within the second set of software libraries based on execution of a generative artificial intelligence (GenAI) model on the first and second sets of libraries, and displaying an identifier of the first and second software libraries via a user interface.

A further example embodiment provides a computer-readable medium comprising instructions, that when read by a processor, cause the processor to perform one or more of training a generative artificial intelligence (GenAI) model based on execution of the GenAI model on software libraries and descriptions of intent of the software libraries, receiving a first set of software libraries and a second set of software libraries, identifying a first software library within the first set of software libraries that includes redundant functionality with a second software library within the second set of software libraries based on execution of a generative artificial intelligence (GenAI) model on the first and second sets of libraries, and displaying an identifier of the first and second software libraries via a user interface.

BRIEF DESCRIPTION OF THE DRAWINGS

FIG. 1 is a diagram illustrating a generative artificial intelligence (GenAI) computing environment according to example embodiments.

FIG. 7A is a diagram illustrating a method of identifying interdependent source codes among different code bases and providing a suggested recommendation to connect to the source codes according to example embodiments.

FIG. 7B is a diagram illustrating a method of identifying software libraries with redundant functionality via GenAI according to example embodiments.

DETAILED DESCRIPTION

Figure 2:
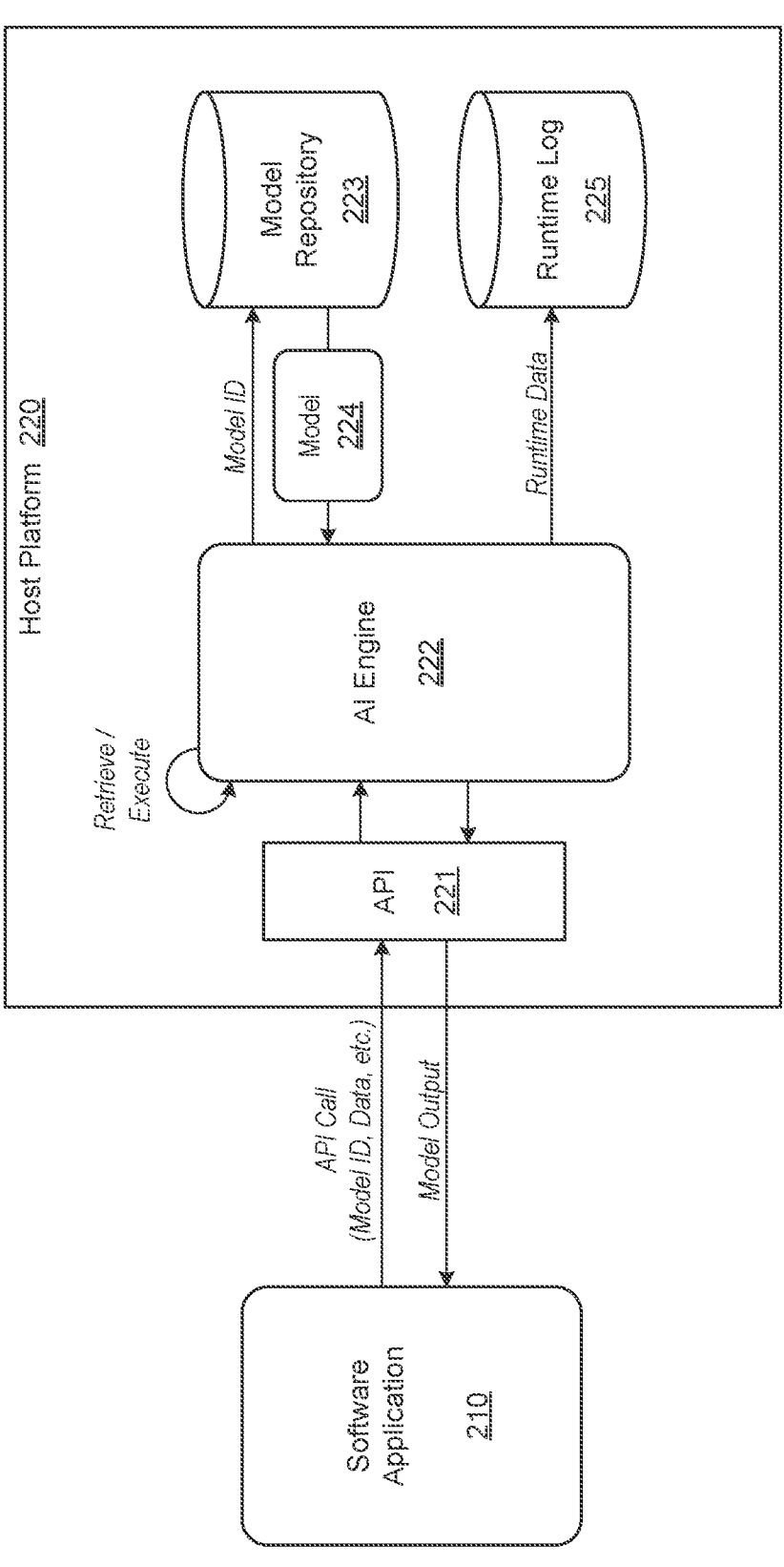
FIG. 2 is a diagram illustrating a process of executing a machine-learning model on input content according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

During development, large software projects are often broken into smaller projects that are developed using smaller groups of developers who work independently from the other smaller groups (e.g., on a particular isolated task). At some point, the smaller projects are combined together to create a finished software project. When the smaller projects are combined, the software libraries, sources codes, and the like, which the different groups develop, are often combined into a single storage system such as a repository, file system, or the like. However, there are often redundancies within the software when it is combined and added to storage. The result is unnecessary storage of redundant software.

Another issue that occurs when smaller projects are combined to create the finished project is that new issues are often discovered. In particular, there is often a missing interface between two different services that have been developed by two different developers/developer groups. For example, the two services may be misaligned based on service providers, based on storage, based on naming conventions of the software, files, data, or the like. As another example, an application programming interface (API) necessary for connecting the two source codes may be missing or may be incorrect, etc. However, it may take the different development groups days or even weeks of time to realize the existence of the issue.

The example embodiments are directed to a generative artificial intelligence (GenAI) system, which can analyze multiple repositories of software (e.g., source code, libraries, etc.) and generate suggestions on how to optimize the software. For example, the GenAI system may analyze a first code base (multiple sets of code) and a second code base (multiple sets of code) to determine if there is a software program (e.g., source code) within the first code base that is interdependent on a different software program (e.g., different source code) within the second code base. In this example, the GenAI model may detect the interdependence based on its training which includes a consumption of large amounts of best practice documents, including flow charts, descriptions, diagrams, architecture drawings, and the like.

According to various embodiments, the GenAI model may be a large language model (LLM), such as a multimodal large language model. As another example, the GenAI model may be a transformer neural network ("transformer") or the like. The GenAI model is capable of understanding connections between software components (e.g., applications, services, data sources, APIs, etc.) within software programs and software libraries. For example, the training of the GenAI model may result in libraries and deep learning frameworks that enable the GenAI model to detect interdependent source code from different code bases. As another example, the GenAI model may identify duplicate functionality within the code or within software libraries and recommend changes to address the duplication.

Figure 1:
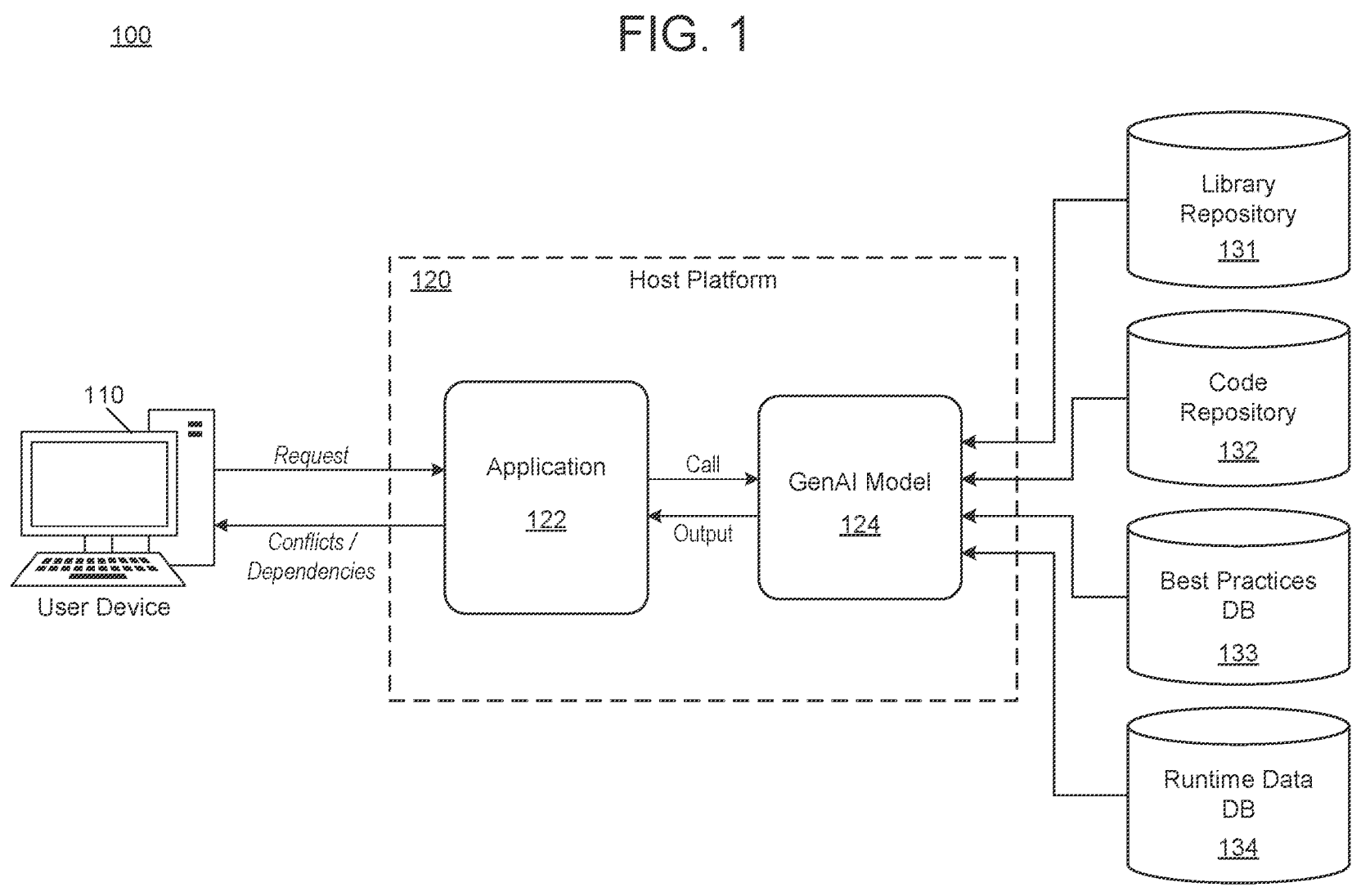

FIG. 1 illustrates a GenAI computing environment according to example embodiments. In particular, FIG. 1 illustrates a process 100 of a host platform 120, such as a cloud platform, web server, etc., interacting with a user device 110 such as a mobile device, a computer, a laptop, or the like, to generate recommendations to optimize a code base. As just one example, the host platform 120 may host a software application 122 that is accessed by the user device 110 over a computer network such as the Internet. The software application 122 may be a mobile application that includes a front-end which is installed on the user device 110, and a back-end which is installed on the host platform 120. As another example, the software application 122 may be a progressive web application (PWA) that is hosted by the host platform 120 and made accessible to the user device 110 via an address on the web.

In the example embodiments, the host platform 120 may include one or more generative artificial intelligence (GenAI) models, including GenAI model 124, which can prompt a user for information (e.g., images, text, etc.) and generating recommendations for optimizing storage of software among different code bases including source code, libraries, and the like. Here, the GenAI model 124 may compare source code (programs) stored within a code repository 131 and make recommendations for optimizing the storage of the software libraries within the code repository 131. As another example, the GenAI model 124 may compare sets of software libraries within a library repository 132 and make recommendations for optimizing the storage of the software libraries within the library repository 132.

The host platform 120 may also include one or more additional models, including one or more machine learning models, one or more artificial intelligence (AI) models, one or more additional GenAI models, and the like. The models, including the GenAI model 124, may be held by the host platform 120 within a model repository (not shown).

In the example embodiments, the GenAI model 124 may be trained based on best practices documents that are stored in a best practices database 133 and/or runtime data of the GenAI model 124, which is stored in a runtime database 134. The runtime data stored within the runtime database 134 may include outputs generated by the GenAI model 124 and feedback on the outputs provided by users, etc. Through the training, the GenAI model can learn connections between the source code and the intent of the source code. The GenAI model can also learn the best coding practices for different software languages.

In the example of FIG. 1, a user has entered a text-based input into a user interface on the user device 110, which is sent to the software application 122 on the host platform 120 over the network. The text may be entered in response to a prompt on the user interface that is generated by the GenAI model 124. However, a prompt is not required. In other words, the user could directly query the software application 122 for information about optimizing software stored within any of the repositories. The software application 122 inputs the text input into the GenAI model 124, which generates a recommendations for optimizing the storage of software.

FIG. 2 illustrates a process 200 of executing a model 224 on input content according to example embodiments. As an example, the model 224 may be the GenAI model 124 described with respect to FIG. 1A, however, embodiments are not limited thereto. Referring to FIG. 2, a software application 210 may request execution of the model 224 by submitting a request to the host platform 220. In response, an AI engine 222 may receive the request and trigger the model 224 to execute within a runti2e environment of the host platform 220.

In FIG. 2, the AI engine 222 may control access to models that are stored within the model repository 223. For example, the models may include GenAI models, AI models, machine learning models, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the payload of data may be a format that is not capable of being input to the model 224 nor read by a computer processor. For example, the payload of data may be in text format, image format, audio format, and the like. In response, the AI engine 222 may convert the payload of data into a format that is readable by the model 224, such as a vector or other encoding. The vector may then be input to the model 224.

In some embodiments, the software application 210 may display a user interface that enables a user to provide feedback from the output provided by the model 224. As just an example, a machine learning model, such as a GenAI model, may predict that two pieces of source code from two different code bases are interdependent. Here, a user may input a confirmation based on a predicted interdependence between the two pieces of source code to indicate whether or not the predicted interdependence is correct. This information may be added to the results of execution and stored within a runtime log 225. The runtime log 225 may include an identifier of the input, an identifier of the output, an identifier of the model used, and feedback from the recipient. This information may be used to subsequently re-train the model.

Figure 3A:
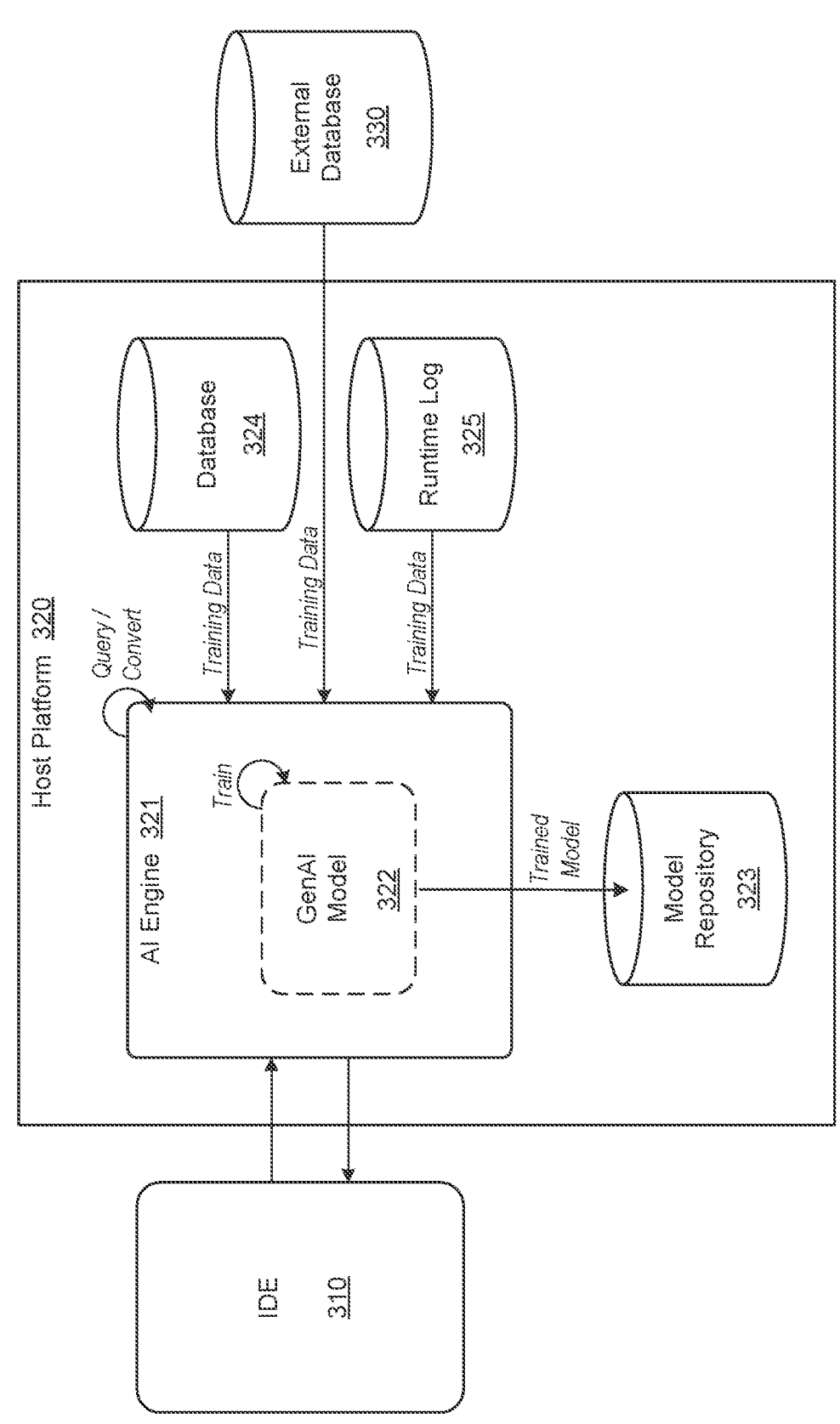
FIGS. 3A-3C are diagrams illustrating processes for training a machine learning model according to example embodiments.

FIG. 3A illustrates a process 300A of training a GenAI model 322 according to example embodiments. However, it should be appreciated that the process 300A shown in FIG. 3A is also applicable to other types of models, such as machine learning models, AI models, and the like. Referring to FIG. 3A, a host platform 320, may host an IDE 310 (integrated development environment) where GenAI models, machine learning models, AI models, and the like may be developed, trained, retrained, and the like. In this example, the IDE 310 may include a software application with a user interface accessible by a user device over a network or through a local connection. For example, the IDE 310 may be embodied as a web application that can be accessed at a network address, URL, etc by a device. As another example, the IDE 310 may be locally or remotely installed on a computing device used by a user.

The IDE 310 may be used to design a model (via a user interface of the IDE), such as a generative artificial intelligence model that can receive text as input and generate custom imagery, etc. The model can then be executed/trained based on the training data established via the user interface. For example, the user interface may be used to build a new model. The training data for training such a new model may be provided from a training data store such as a database 324, which includes training samples from the web, from customers, and the like. As another example, the training data may be pulled from one or more external data stores 330 such as publicly available sites, etc.

During training, the GenAI model 322 may be executed on training data via an AI engine 321 of the host platform 320. The training data may include a large corpus of generic images and text that is related to those images. In the example embodiments, the training data may include programming language best practice documents that are publicly available on the World Wide Web, internal best practice documents of an organization and the like. The GenAI model 322 may learn mappings/connections between different pieces of software and different types of software during the execution and can thus identify two pieces of code that are interdependent or duplicates. When the model is fully trained, it may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/images that are custom generated by the GenAI model 322 and the user feedback of the predicted redundancies and the predicted interdependencies. The responses may include indications of whether the output of the GenAI model 322 is correct or not. This data may be captured and stored within a runtime log 325 or other data store within the live environment and can be subsequently used to retrain the GenAI model 322.

Figure 3B:
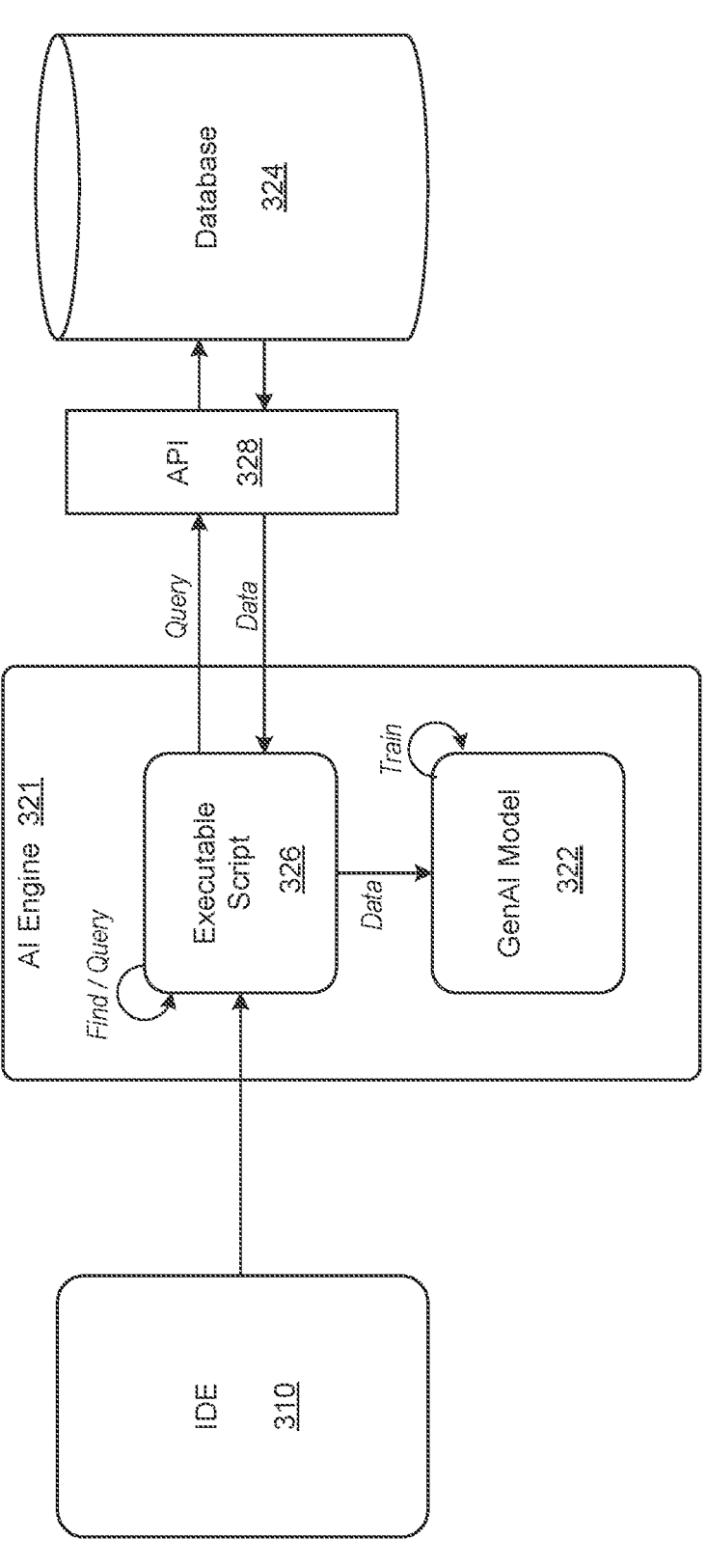

FIG. 3B illustrates a process 300B of executing a training process for training/retraining the GenAI model 322 via an AI engine 321. In this example, a script 326 (executable) is developed and configured to read data from a database 324 and input the data to the GenAI model 322 while the GenAI model is running/executing via the AI engine 321. For example, the script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, where it is input to the GenAI model 322. The process may be managed via a user interface of the IDE 310, which enables a human-in-the-loop during the training process (supervised learning). However, it should also be appreciated that the system is capable of unsupervised learning as well.

The script 326 may iteratively retrieve additional training data sets from the database 324 and iteratively input the additional training data sets into the GenAI model 322 during the execution of the model to continue to train the model. The script may continue the process until instructions within the script tell the script to terminate, which may be based on a number of iterations (training loops), total time elapsed during the training process, etc.

Figure 3C:
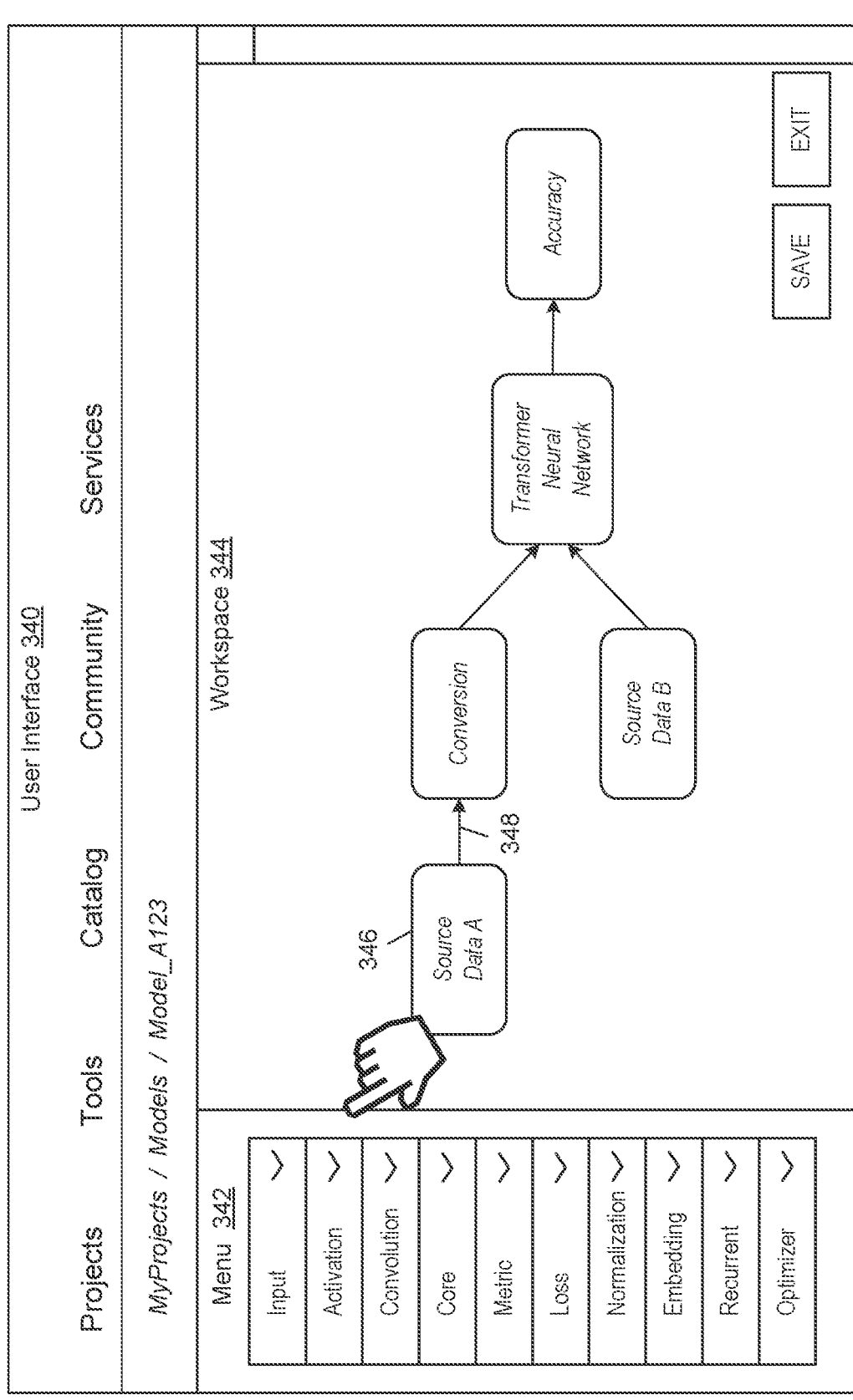

FIG. 3C illustrates a process 300C of designing a new AI model via a user interface 340 according to example embodiments. As an example, the user interface 340 may be output as part of the software application which interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options which can be selected to drill down into additional components that can be added into the model design shown in the workspace 344. Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a diagram of a new model within the workspace 344. For example, the user may connect the node 346 to another node in the diagram via an edge 348, creating a dependency within the diagram. When the user is done, the user can save the model for subsequent training/testing.

According to various embodiments, the GenAI model described herein may be trained based on custom-defined prompts that are designed to draw out specific attributes associated with a software library, a software architecture, a document associated with a software library, source code, and the like. These same prompts may be output during live execution of the GenAI model. For example, a user may input a description of a service and its function. The description/attributes can then be used by the GenAI model to identify a duplicate service with a duplicate function. The prompts may be generated via prompt engineering that can be performed through the model training process, such as the model training process described above in the examples of FIGS. 3A-3C.

Prompt engineering is the process of structing sentences (prompts) so that the GenAI model understands them. A prompt may include a description of a goal, such as a goal of purchasing a particular type of car. The prompt may also provide a color, year, make, and model of the car. All of this information may be input to the GenAI model and used to create a custom image of the goal to enable the user to visualize the goal. Part of the prompting process may include delays/waiting times that are intentionally included within the script such that the model has time to think/understand the input data.

Figure 4:
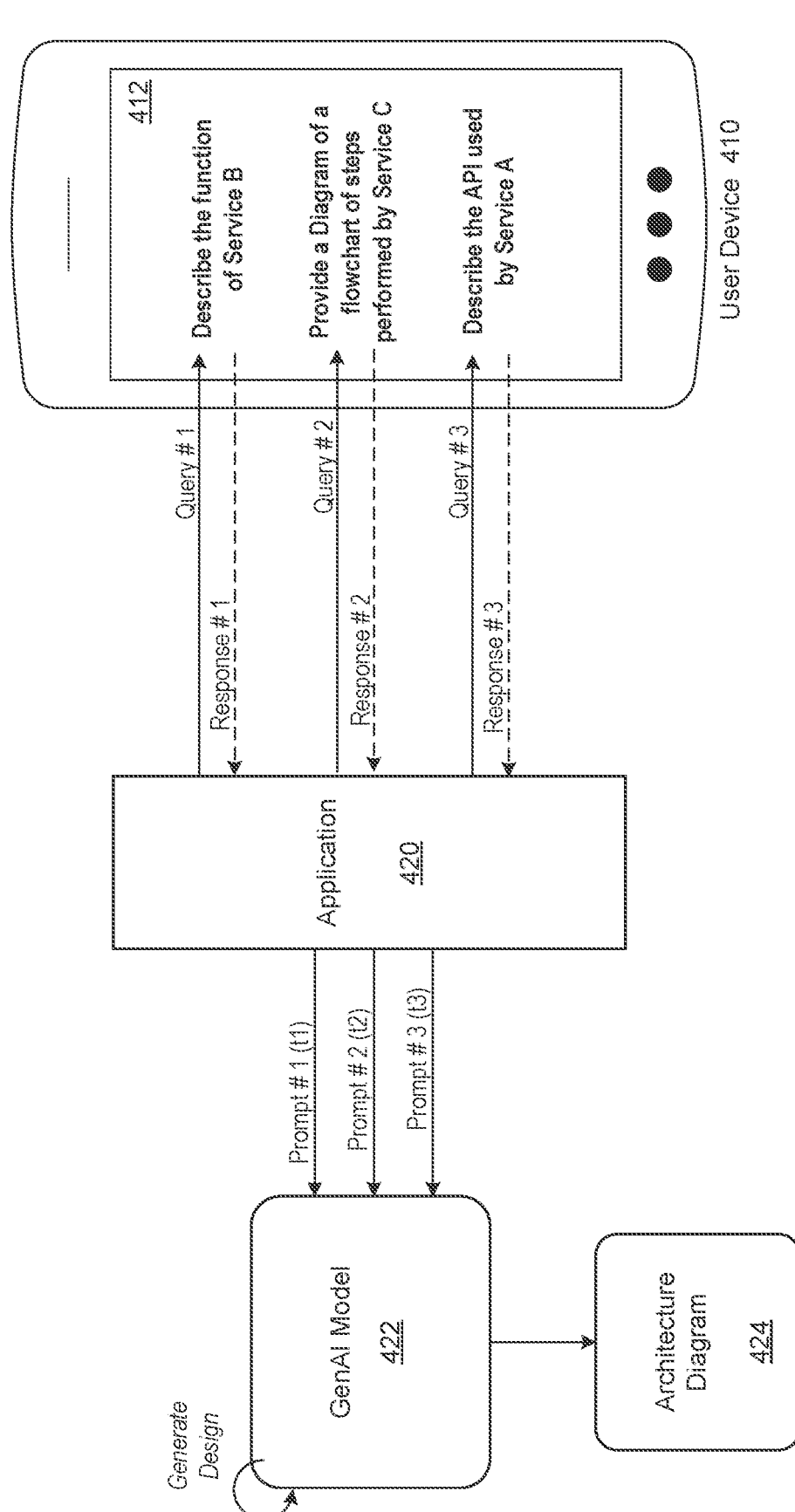
FIG. 4 is a diagram illustrating a process of prompting a GenAI model to generate an architecture diagram according to example embodiments.

FIG. 4 illustrates a process 400 of a GenAI model 422 generating an architecture diagram 424 of a software architecture based on prompts and responses to the prompts according to example embodiments. Referring to FIG. 4, the GenAI model 422 may be hosted by a host platform and may be part of a software application 420 that is also hosted on the host platform. Here, the software application 420 may establish a connection with a user device 410, such as a secure network connection. The secure connection may include a PIN, biometric scan, password, username, TTL handshake, etc.

In the example of FIG. 4, the software application 420 may control the interaction of the GenAI model 422 on the host platform and the user device 410. In this example, the software application 420 may output queries on a user interface 412 of the user device 410 with requests for information from the user. The user may enter values into the fields on the user interface corresponding to the queries, and submit/transfer the data to the software application 420, for example, by pressing a submit button, etc. In this example, the application may combine the query with the response from the user interface and generate a prompt that is submitted to the GenAI model 422. For example, each prompt may include a combination of a query on the UI plus the response from the user. For example, if the query is "Please describe the purpose of the software system" and the response is "The software system is an API that manages access to a cloud database", then the text from both the prompt and the response to the prompt may be submitted to the GenAI model 422.

In some embodiments, the software application 420 may deliberately add waiting times between submitting prompts to the GenAI model 422 to ensure that the model has enough time to "think" about the answer. The waiting times may be integrated into the code of the software application 420 or they may be modified/configured via a user interface. Furthermore, the ordering of the prompts and the follow-up questions that are asked may be different depending on the answers given during the previous prompt or prompts. The content within the prompts and the ordering of the prompts can cause the GenAI model 422 to generate descriptions of redundancies, interdependencies, duplicates, and the like, among different code bases, repositories, and the like. Each prompt may include multiple components, including one or more of context, an instruction, input data, and an expected response/output.

The example embodiments are directed to a GenAI system that is able to optimize storage of software, including software programs, source code, libraries, and the like. The GenAI model may be trained based on documents that describe the best practices for developing source code in different programming languages. For example, the GenAI model may execute on the documents and learn connections between natural language terms and software components. The trained model can then analyze code bases (e.g., sets of source code, programs, etc.) that are being merged and ways to optimize the merger.

Figure 5A:
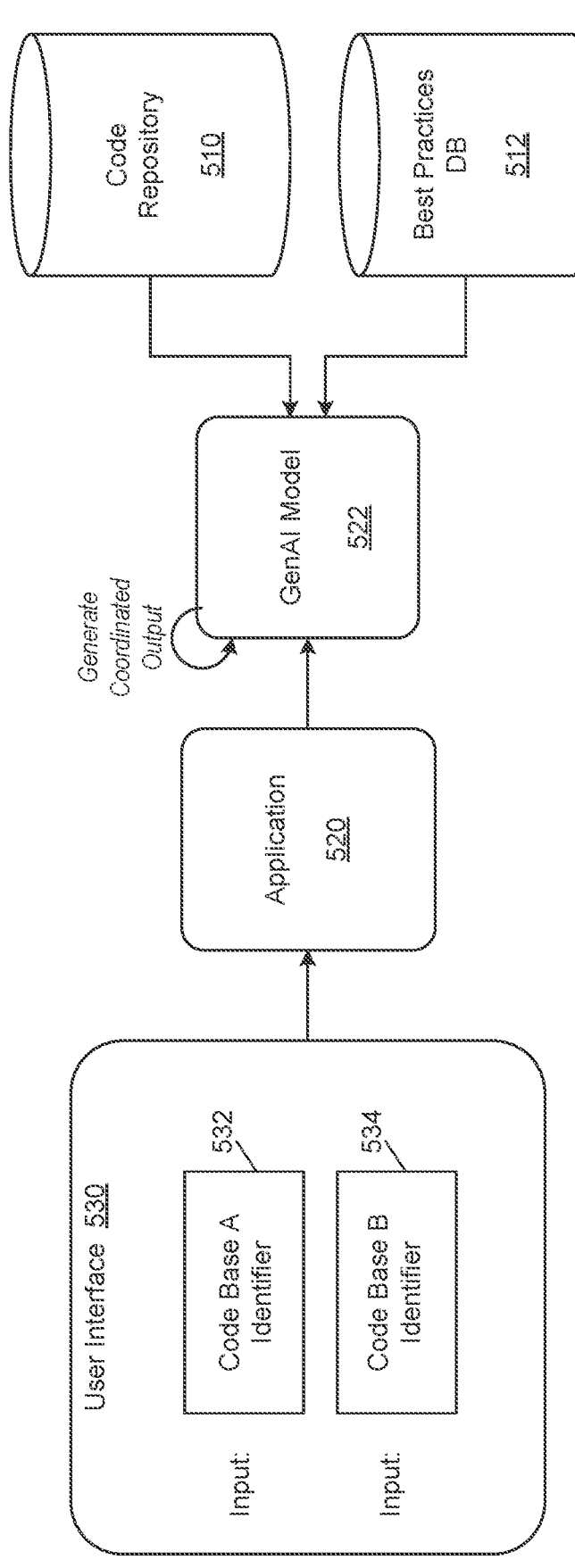
FIGS. 5A-5D are diagrams illustrating a process of coordinating service designs among multiple software developers according to example embodiments.

FIGS. 5A-5D illustrate a process of coordinating service designs among multiple software developers according to example embodiments. For example, FIG. 5A illustrates a process 500 of optimizing code between a first code base and a second code base which are stored in a code repository 510. Here, each code base may include multiple programs stored therein, such as multiple files of source code, etc. In this example, the first code base and the second code base are generated by different development teams of an organization and subsequently stored within the code repository 510. Here, a host platform (not shown) may host a software application 520 that includes a generative artificial intelligence (GenAI) model 522 that is trained based on best programming practices, such as best programming practices documentation available online, internally, or the like. In addition, the documentation may be stored within a best practices data store 512 of the host platform.

According to various embodiments, a user may request the software application 520 to optimize the code stored among multiple code bases of the same organization. For example, a user may access the host platform via a user device (not shown), open a user interface 530 of the software application 520 on the user device, and enter inputs 532 and 534, identifying two different code bases to compare. Here, the inputs 532 and 534 may be submitted from the user interface 530 to the software application 520 (e.g., via a network, etc.).

In response, the software application 520 may execute the GenAI model 522 based on the inputs 532 and 534. In particular, the software application 520 may retrieve the source code of the two different code bases from the code repository 510 and input the source code into the GenAI model 522. In response, the GenAI model 522 may identify interdependent programs (e.g., modules, services, applications, APIs, etc.) that are interdependent with one another. In particular, the GenAI model may identify that the source code of the programs is interdependent based on calls, flows, data variables, intent of the source code, etc.

Figure 5B:
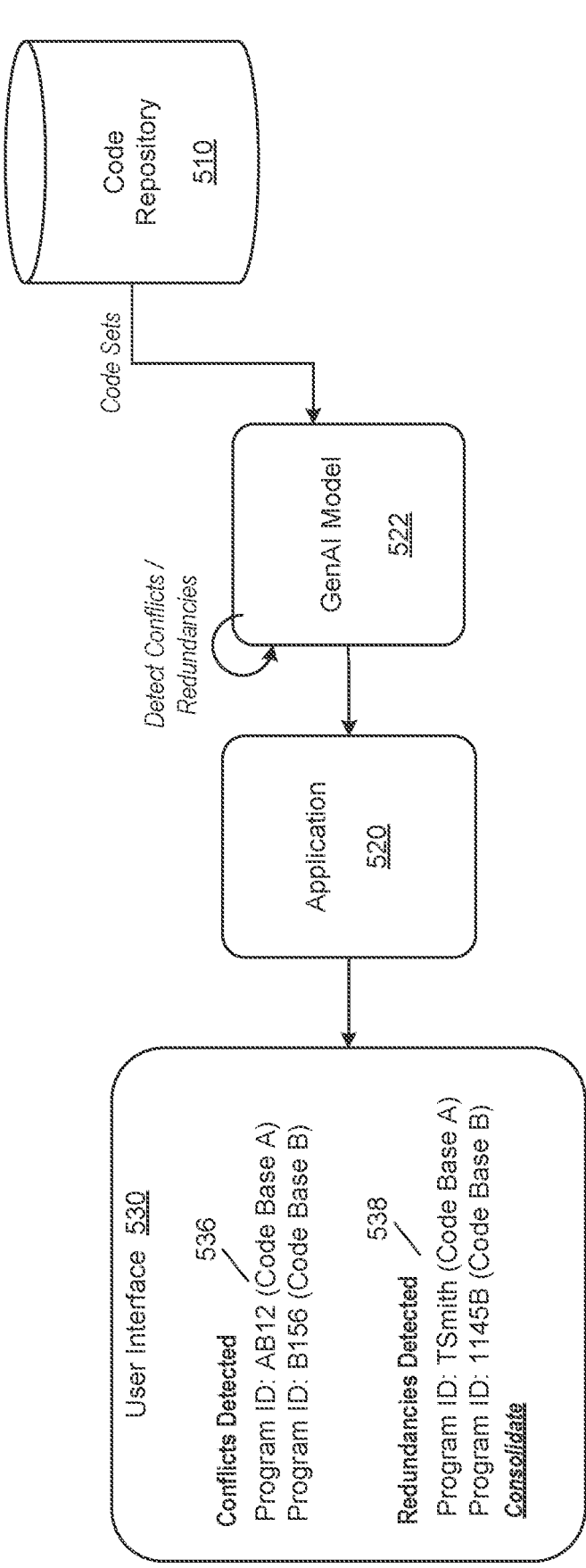

Referring to FIG. 5B, the GenAI model 522 may perform a number of different processes, including process 540 which includes a redundancy and conflict check. The GenAI model 522 may also perform a best practices check, identify integration recommendations, detect gaps, and the like. The inputs to the GenAI model 522 may include the code bases (e.g., the different source codes from each code base, etc.). During the redundancy and conflict check, the GenAI model 522 may analyze the source code within the two different code bases to identify duplicates with the same source code and naming convention. Identifiers 536 of each of the duplicate software programs (e.g., source codes) may be output by the GenAI model 522 and displayed on the user interface 530 by the software application 520.

Furthermore, the GenAI model 522 may identify source codes that are functionally equivalent enough to be considered duplicates even though the name, source code, etc. is different. Here, the model can check for redundancies by attempting to understand the intent behind the code, and recommend where that intent may be duplicative. For example, the GenAI model 522 may predict an intent of each piece of source code. If there is a duplicate intent, then the corresponding source codes can be considered duplicates by the system, even though the actual content within the code may be different. This can lead to a display of identifiers 538 of the redundant software programs on the user interface. In addition, a link or other instructions can be displayed on the user interface 530 with a recommendation to consolidate the redundant software programs and how to do so. This recommendation can be generated by the GenAI model 522 based on its training. As just an example, the consolidation may include integrating one of the programs into the other program, deleting one of the programs and replacing it with the other program, or the like.

Figure 5C:
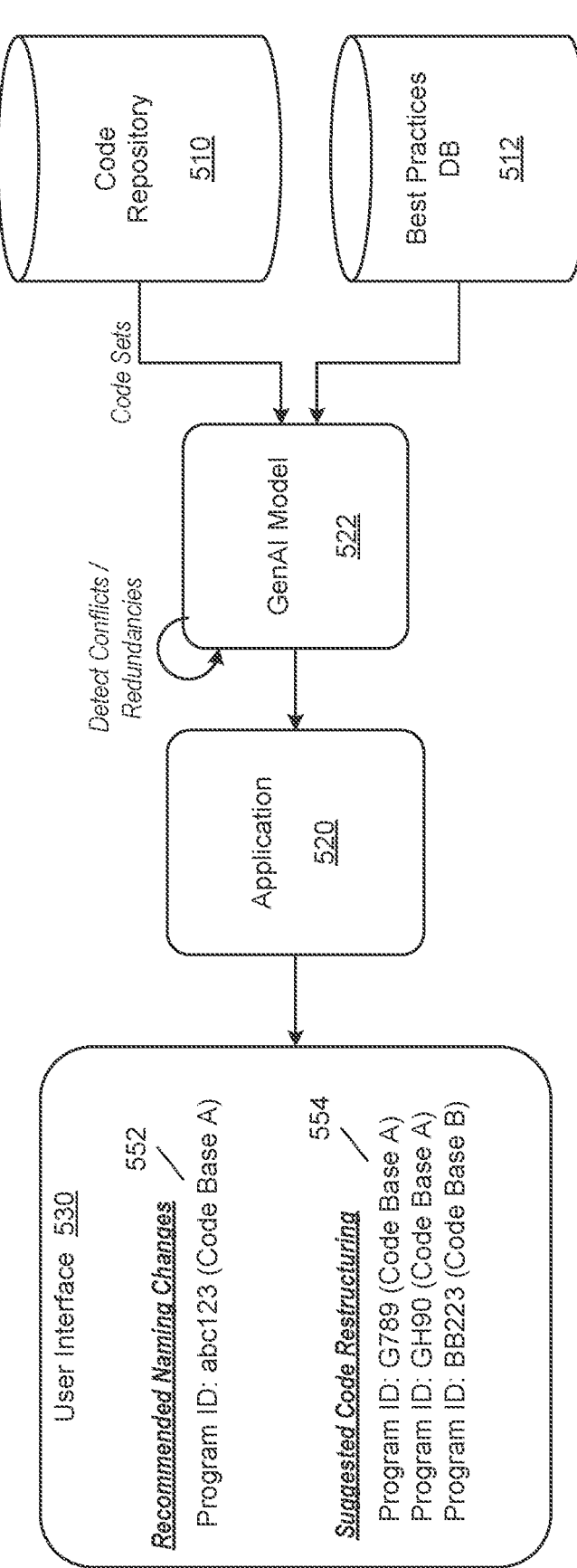

The GenAI model 522 may also perform a best practices check as shown in process 550 shown in FIG. 5C. Here, given the two code bases and prior knowledge of organizational best practices, the GenAI model 522 may check for source code to be integrated and generate recommendations for changes to existing programs, applications, APIs, and the like. For example, the recommendations could include naming conventions, automatic test case generation, code structure reworks (e.g., MVC, provider pattern, etc.), generating appropriate annotations for auto-documentation creation, and the like. Here, recommended name changes 552 can be displayed on the user interface 530 along with suggested code restructurings 554 that are identified from the best practices. The GenAI model may also generate the code to leverage more effective patterns.

Figure 5D:
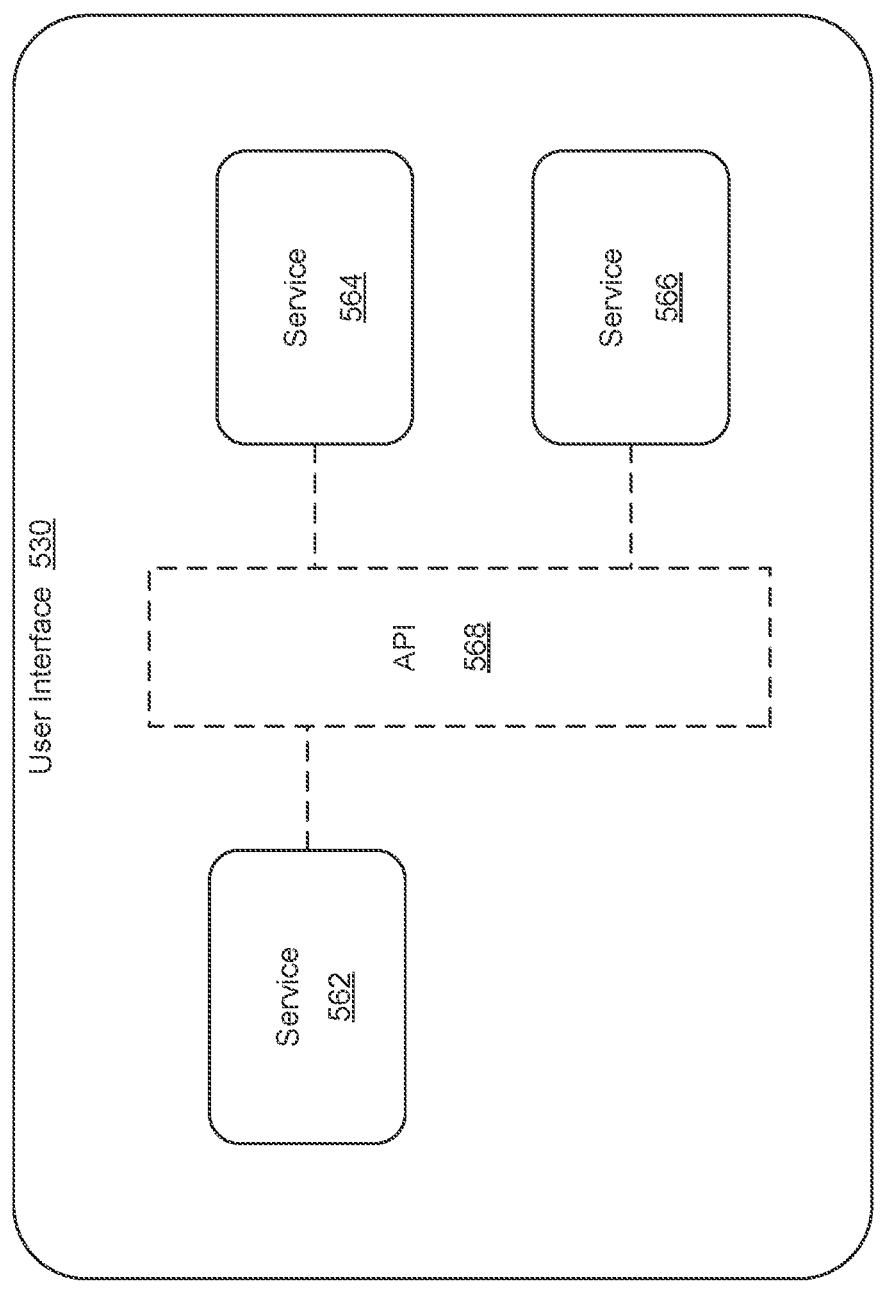

In FIG. 5D, the GenAI model performs a process 560 of recommending changes to integrate code from the two different code bases. Here, the model may examine the underlying source code for context/intent of the code. Based on the understanding of the intent, the model can identify interdependent components of the code and make integration recommendations. For example, the GenAI model 522 may identify a source code from a first service (e.g., service 562) that is interdependent with source code from a second code base (e.g., service 564 and service 566, etc.). Here the identifying may be based on the intents of the source code, naming conventions, or the like. In response, the GenAI model 522 may identify a new software component 568 to add to the code bases to integrate the interdependent source codes from the different code bases. In addition, an identifier of the new software component 568 may be displayed on the user interface. Furthermore, although not shown in FIG. 5D, the GenAI model 522 may also generate the necessary code for the new software component 568 and display it on the user interface 530.

Furthermore, appropriate interfaces can be recommended to integrate the interdependent services, or alternatively, recommendations could be made to modify existing components, for example in the case of a model, view, controller (MVC) application, the view and controller could be directly modified to integrate, effectively allowing the view to make use of the respective controllers. In addition, based on the combined output of the above, the GenAI model 522 may also identify gaps based on an understanding of the overall intent of the code. This could be done by directly exploring problems that the model was not able to remediate in any of the above steps and making more general recommendations for vising the issues.

Figure 6A:
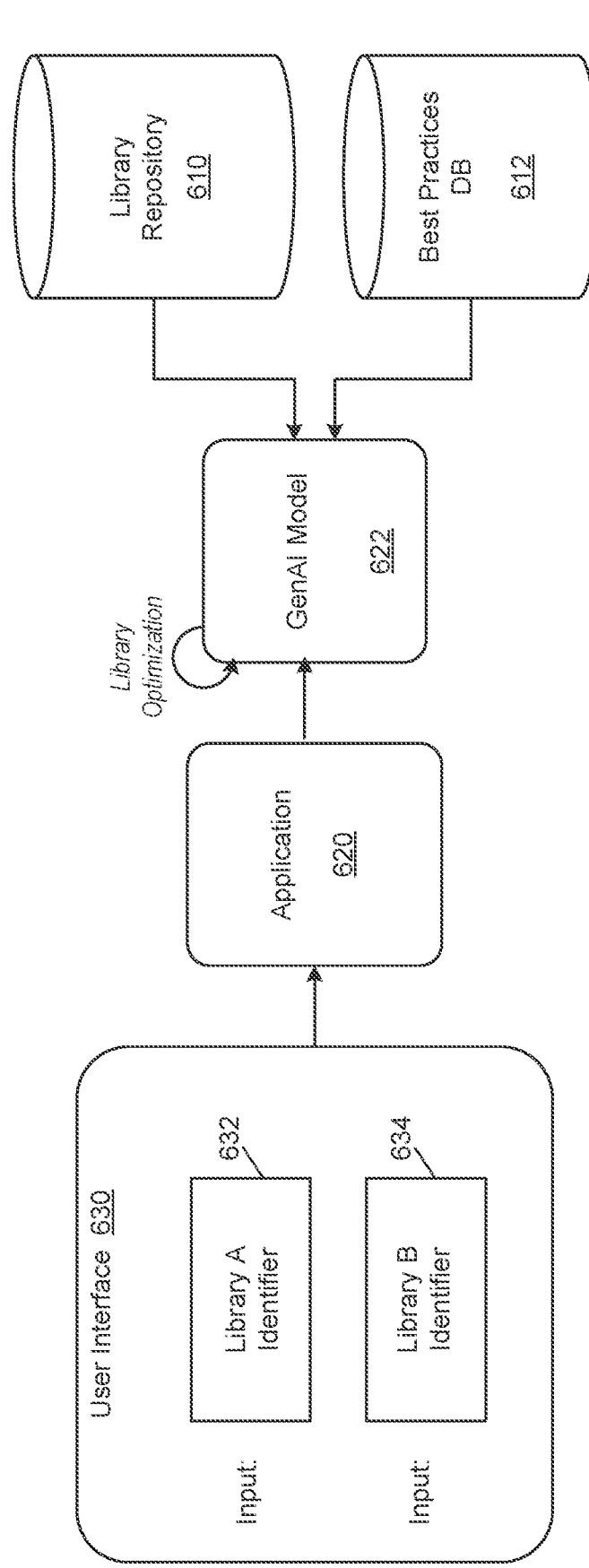
FIGS. 6A-6C are diagrams illustrating a process of optimizing library storage among different sets of libraries according to example embodiments.
Figure 6B:
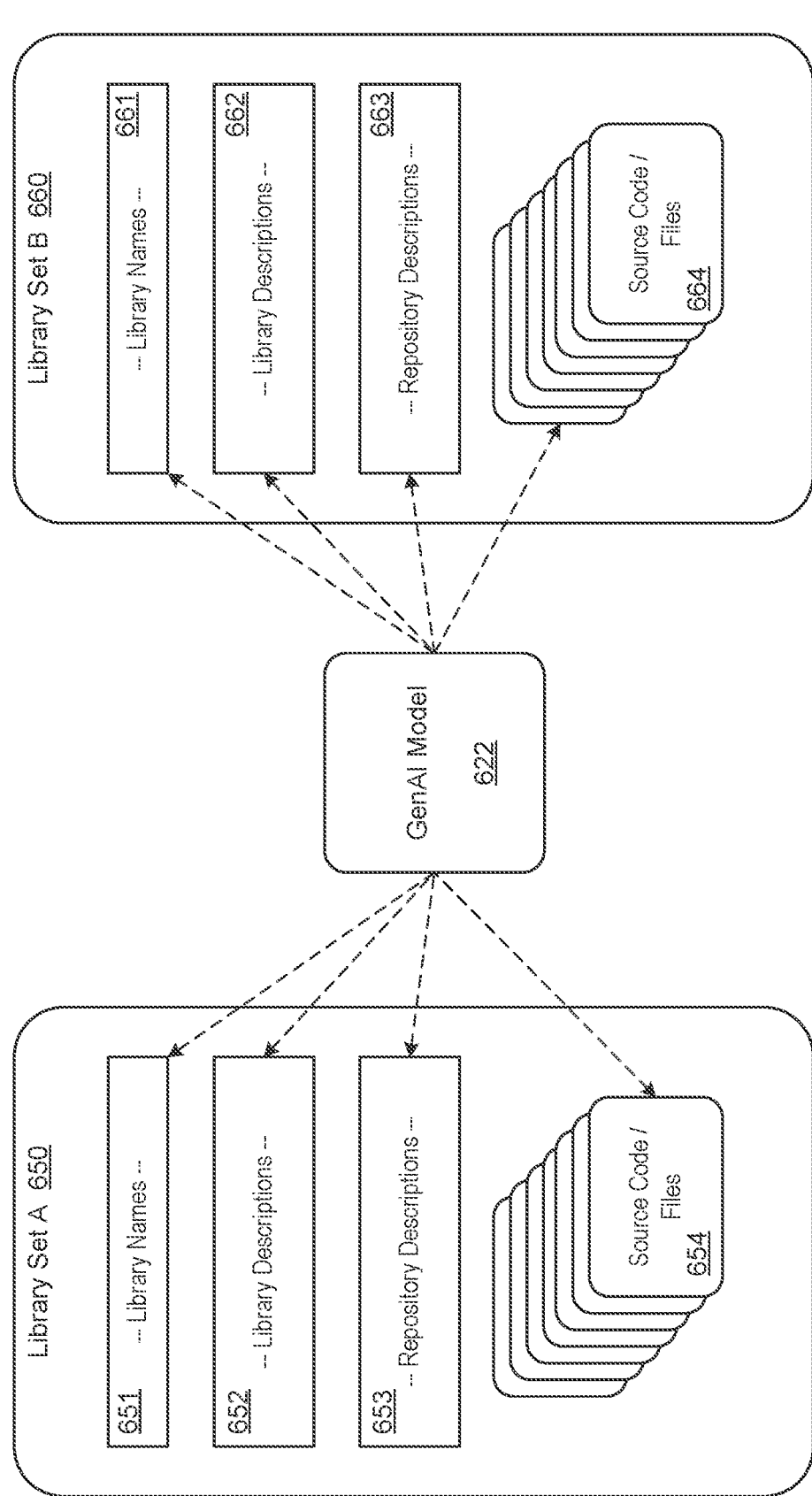
Figure 6C:
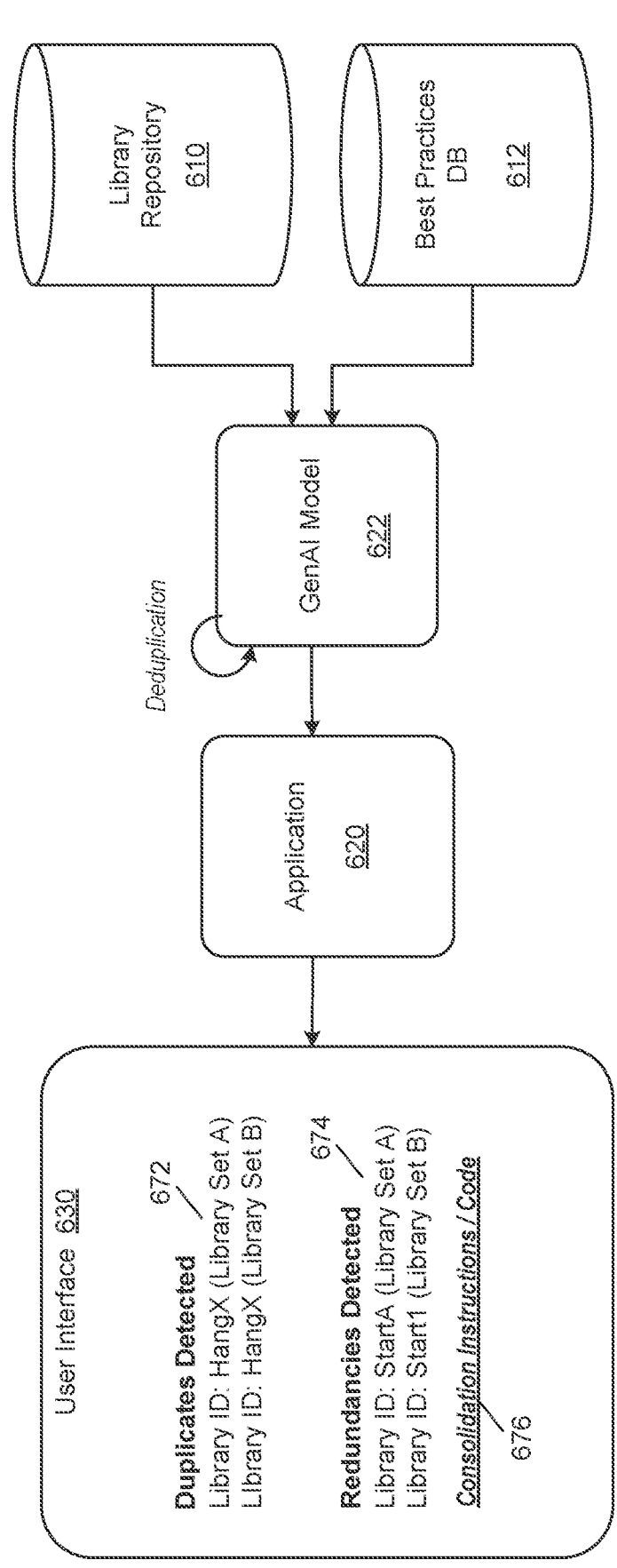

FIGS. 6A-6C illustrate a process of optimizing library storage among different sets of libraries according to example embodiments. For example, FIG. 6A illustrates a process 600 of performing a deduplication operation as well as other optimization functions on multiple sets of libraries (e.g., multiple repositories of libraries within a same organization, etc.) Referring to FIG. 6A, a software application 620 may be hosted by a host platform (not shown), such as a cloud platform, web server, or the like. The software application 620 includes a generative artificial intelligence (GenAI) model 622 that can optimize the storage of libraries, such as the storage of libraries from multiple different development groups within an organization. In this example, the software libraries may be stored within one or more library repositories such as a library repository 610 or the like. Here, the GenAI model 622 may be trained based on best programming practices, such as best programming practices documentation available online, internally, or the like, which are stored within a best practices database 612. In addition, the documentation may be stored within a best practices data store 512 of the host platform.

The software application 620 may output a user interface 630 which may include controls for inputting commands to control execution of the GenAI model 622 on libraries stored within the library repository 610. As an example, the user interface 630 may be part of a front-side of the software application 620 that is open within a web browser, a mobile application, etc. on a user device (not shown). In this example, the user interface 630 includes input fields 632 and 634 which enable a user to enter identifiers of libraries (or sets of libraries) that are stored within the library repository 610 (and/or libraries stored within one or more other library repositories, etc.)

According to various embodiments, the GenAI model 622 may be trained to understand library best practices by executing the GenAI model 622 on best practices documentation for software libraries. The best practices documentation may be related to one or more programming languages (e.g., Java, Python, C, etc.) As such, when the user enters identifiers of two different sets of libraries into the input field 632 and the input field 634, respectively, the user interface 630 may send the inputs to the software application 620, which converts the inputs into a vector or other encoding and feeds it to the GenAI model 622, for example, via an executable script. The GenAI model 622 can generate recommendations to optimize the libraries within the two different sets of libraries, including redundancy checking, deduplication, efficiency checking, security checks, and the like.

FIG. 6B illustrates a process 640 of analyzing two different sets of libraries, including a first set of libraries 650 and a second set of libraries 660, and optimizing storage of individual source codes (software libraries) within the storage. Here, the GenAI model 622 may understand compiled code. As another example, the GenAI model 622 may have a method of decompiling or accessing respective source code to understand the underlying intent of a software library. During operation, the GenAI model 622 may receive the source code of the library as an input and output an intent (e.g., function, components involved, etc.) The intent may be identified from various attributes, including the source code itself, as well as attributes of the library, the repository where the library is held, metadata, and the like.

For example, the GenAI model 622 may read library names 651 of the libraries stored within the first set of libraries 650 and compare them to library names 661 of libraries stored within the second set of libraries 660 to identify duplicate names. For example, if the names are identical, a deduplication operation may be performed. As another example, the GenAI model 622 may ingest library descriptions 652 of the libraries stored within the first set of libraries 650 and compare them to library descriptions 662 of libraries stored within the second set of libraries 660 and identify an intent of the respective libraries based on the descriptions. The intent can then be used to perform deduplication. Here, the library names may not match, but the intent of both libraries is the same and therefore can be deduplicated in some way.

As another example, the GenAI model 622 may perform a library description check from repository descriptions 653 of the first set of libraries 650 and repository descriptions 663 of the second set of libraries 660. Here, the repository descriptions 653 and 663 may be posted at endpoints in the respective repositories and can be queried by the software application 620. The descriptions can imply the functionality of the libraries. Furthermore, the GenAI model 622 may identify source code files 654 in the first set of libraries 650 and source code files 664 in the second set of libraries and compare the respective source code files 654 and 664 to each other to identify duplicates and redundancies. Evaluating source code will provide more context to the different checks, as well as allowing for more robust understanding to better ensure the recommendations make sense and the libraries provide exact functionality.

In addition, the GenAI model 622 may perform efficiency checks by examining the source code files 654 and 664 to understand if two libraries that provide the same functionality also provide the same efficiency in the form of how they provide the functionality, as this may be critical to some applications, i.e., high-frequency trading. In addition, the GenAI model 622 may perform security checks to ensure that no vulnerabilities exist within certain functions of one in use library and not the other.

FIG. 6C illustrates a process 670 of displaying identifiers of the duplicate libraries along with instructions on how to perform an optimization operation such as deduplication of a library, combining of multiple libraries into one, reworking the source code of a library, and the like. In the example of FIG. 6C, a pair of duplicate libraries 672 are detected by the GenAI model 622 based on the analysis performed in FIG. 6B. Here, the pair of duplicate libraries 672 are exactly the same. In this example, the GenAI model 622 may suggest a deduplication operation to delete one of the libraries in the pair of duplicate libraries 672 to conserve storage in the library repository 610 (or some other storage).

In addition, the GenAI model 622 also detects a pair of redundant libraries 674 which have the same intent/function as one another but which are not completely the same. Here, the GenAI model 622 may display identifiers of the libraries as well as a link 676 with instructions on how to combine the pair of redundant libraries 674 into one single library to conserve storage within the library repository 610. In some embodiments, the GenAI model 622 may also generate the code necessary for reworking the libraries to combine them. The code may be displayed on the user interface 630 enabling a user to easily copy it from the user interface 630 and add it to their source code.

FIG. 7A illustrates a method 700 of identifying interdependent source codes among different code bases and providing a suggested recommendation to connect to the source codes according to example embodiments. As an example, the method 700 may be performed by a computing system, a software application, a server, a cloud platform, a combination of systems, and the like. Referring to FIG. 7A, in 701, receiving a first code base and a second code base from a software repository, wherein each of the first and second code bases comprise source code of a plurality of different software programs. Each software program may include its own source code that is stored in a repository, file, file system, etc. The software program may include a service, a microservice, an application, an API, a script, a method, a handler, and/or the like.

In 702, the method may include identifying a source code within the first code base that is interdependent with a source code within the second code base based on execution of a generative artificial intelligence (GenAI) model on the first and second code bases. In 703, the method may include determining a software component to connect the source code within the first code base to the source code within the second code base. In 704, the method may include displaying an identifier of the software component via a user interface.

In some embodiments, the determining may include determining a modification to an existing code module of the source code within the first code base to connect the source codes based on the execution of the GenAI model, and displaying an identifier of the modification to the existing code module via the user interface. In some embodiments, the method may further include identifying an intent of the source code within the first set of code base and an intent of the source code within the second code base based on the execution of the GenAI model. in some embodiments, the method may further include determining that that the source code within the first code base is interdependent with the source code within the second code base based on the identified intents.

In some embodiments, the method may further include determining a software component is missing between the source code within the first set of code base and the source code within the second code base based on the execution of the GenAI model, and recommending a code change to address the missing software component via the user interface. In some embodiments, the displaying may include displaying a software architecture diagram of the source code of the first code base and display the identifier of the software component within the software architecture diagram.

In some embodiments, the determining may include determining the source code within the first code base is interdependent with the source code within the second code base based on execution of the GenAI model on a naming convention of the source code of the first code base and a naming convention of the source code of the second code base. In some embodiments, the method may further include identifying a second source code within the first code base that is a duplicate of a second source code within the second code base based on execution of the GenAI model and displaying an identifier of the duplicate second code base via the user interface.

FIG. 7B illustrates a method 710 of identifying software libraries with redundant functionality via GenAI according to example embodiments. As an example, the method 710 may be performed by a computing system, a software application, a server, a cloud platform, a combination of systems, and the like. Referring to FIG. 7B, in 711, the method may include training a generative artificial intelligence (GenAI) model based on execution of the GenAI model on software libraries and descriptions of intent of the software libraries. The software libraries may include APIs, programs, services, documents, guides, and the like.

In 712, the method may include receiving a first set of software libraries and a second set of software libraries. In 713, the method may include identifying a first software library within the first set of software libraries that includes redundant functionality with a second software library within the second set of software libraries based on execution of a generative artificial intelligence (GenAI) model on the first and second sets of libraries. In 714, the method may include displaying an identifier of the first and second software libraries via a user interface.

the identifying comprises determining that the first software library and the second software library include the redundant functionality based on execution of the GenAI model on naming conventions of the first and second software libraries. In some embodiments, the method may further include determining an intent of the first software library based on execution of the GenAI model on source code of the first software library and an intent of the second software library based on execution of the GenAI model on source code of the second software library. In some embodiments, the identifying may include identifying that the first software library and the second software library include redundant functionality based on the determined intents of the first and second software libraries determined by the GenAI model.

In some embodiments, the method may further include reading a description of the first software library from a first software repository and reading a description of the second software library from a second software repository, wherein the identifying comprises identifying that the first software library and the second software library include redundant functionality based on execution of the GenAI model on the descriptions of the first and second software libraries.

In some embodiments, the method may further include determining an efficiency of the first software library and an efficiency of the second software library based on execution of the GenAI model. In some embodiments, the method may further include determining that the first software library and the second software library include redundant functionality based on the efficiency of the first software library and the efficiency of the second software library. In some embodiments, the method may further include receiving feedback about the identifier of the first and second software libraries via the user interface and retraining the GenAI model based on execution of the GenAI model on the feedback about the identifier of the first and second software libraries.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 8 illustrates an example computer system architecture, which may represent or be integrated in any of the above-described components, etc.

Figure 8:
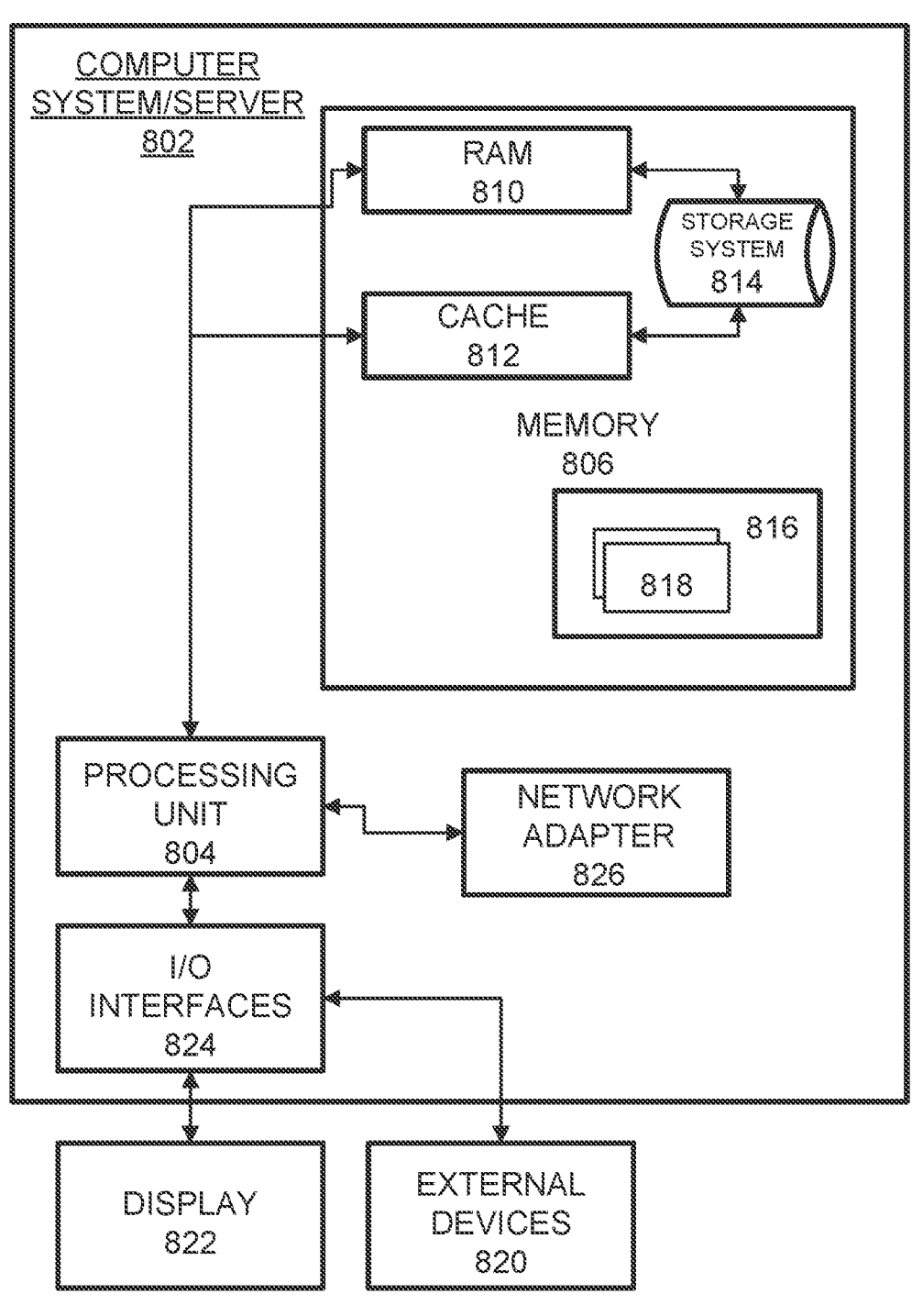
FIG. 8 is a diagram illustrating a computing system that may be used in any of the example embodiments described herein.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be in both local and remote computer system storage media, including memory storage devices.

As shown in FIG. 8, computer system/server 802 in the example system 800 is shown in the form of a general-purpose computing device. The components of computer system/server 802 may include, but are not limited to, one or more processors or processing units (processor 804), a system memory 806, and a bus that couples various system components, including the system memory 806 to the processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system-readable media. Such media may be any of available media that is accessible by computer system/server 802, and it includes both volatile and non-volatile media, removable and non-removable media. The system memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 806 may include at least one program product having a set (e.g., at least one) of program modules that are configured to carry out the functions of various embodiments of the application.

Program/utility 816, having a set (at least one) of program modules 818, may be stored in the system memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those that are disclosed. Therefore, although the application has been described based on these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
a processor configured to:
    receive a first set of software libraries and a second set of software libraries;
    execute a generative artificial intelligence (GenAI) model on source code and repository descriptions of software libraries from among the first set of software libraries and the second set of software libraries to determine functional intent for the software libraries;
    identify that a first software library from the first set of software libraries and a second software library from the second set of software libraries include a redundant functionality based on a comparison of corresponding functional intents of the first software library and the second software library;
    generate an instruction to pair the first software library and the second software library; and
    display the instruction on a user interface.

2. The apparatus of claim 1, wherein the processor is configured to:
    identify that the first software library and the second software library include the redundant functionality based on naming conventions of the first software library and the second software library.

3. The apparatus of claim 1, wherein the processor is configured to:
    identify the corresponding functional intents of the first software library and the second software library based on a first source code of the first software library and a second source code of the second software library.

4. The apparatus of claim 1, wherein the processor is configured to:

read a description of the first software library from a first software repository; and
    read a description of the second software library from a second software repository, and
    identify that the first software library and the second software library include the redundant functionality based on the description of the first software library and the description of the second software library.

5. The apparatus of claim 1, wherein the processor is configured to:
    determine corresponding efficiencies of the first software library and the second software library.

6. The apparatus of claim 5, wherein the processor is configured to:
    identify that the first software library and the second software library include the redundant functionality based on the corresponding efficiencies.

7. The apparatus of claim 1, wherein the processor is configured to:
    receive feedback about the corresponding functional intents using the user interface; and
    retrain the GenAI model using the feedback, wherein an AI agent performs an action based on the corresponding functional intents.

8. The apparatus of claim 1, wherein the processor is configured to execute a security check on the first software library and the second software library based on at least one of a first source code of the first software library and a second source code of the second software library.

9. The apparatus of claim 1, wherein the processor is configured to receive feedback indicating whether the first software library and the second software library include the redundant functionality, and update the GenAI model based on the user feedback.

10. The apparatus of claim 1, wherein the processor is configured to determine that the first software library and the second software library have different names but a shared functional intent as determined by the GenAI model, and perform a deduplication operation to remove one of the first software library and the second software library.

11. A method comprising:
    receiving a first set of software libraries and a second set of software libraries;
    executing a generative artificial intelligence (GenAI) model on source code and repository descriptions of software libraries from among the first set of software libraries and the second set of software libraries to determine functional intent for the software libraries;
    identifying that a first software library from the first set of software libraries and a second software library from the second set of software libraries include a redundant functionality based on a comparison of corresponding functional intents the first software library and the second software library;
    generating an instruction to pair the first software library and the second software library; and
    displaying the instruction on a user interface.

12. The method of claim 11, wherein the identifying comprises:
    identifying that the first software library and the second software library include the redundant functionality based on naming conventions of the first software library and the second software library.

13. The method of claim 11, wherein the method further comprises:
    identifying the corresponding functional intents of the first software library and the second software library based on a first source code of the first software library and a second source code of the second software library.

14. The method of claim 11, wherein the method further comprises:
reading a description of the first software library from a first software repository; and
reading a description of the second software library from a second software repository,
wherein the identifying comprises:
identifying that the first software library and the second software library include the redundant functionality based on the description of the first software library and the description of the second software library.

15. The method of claim 11, wherein the method further comprises:
determining corresponding efficiencies of the first software library and the second software library.

16. The method of claim 15, wherein the identifying comprises:
identifying that the first software library and the second software library include the redundant functionality based on the corresponding efficiencies.

17. The method of claim 11, wherein the method further comprises:
receiving feedback about the corresponding functional intents using the user interface; and
retraining the GenAI model using the feedback, wherein an AI agent performs an action based on the corresponding functional intents.

18. A non-transitory computer-readable medium comprising instructions that, when executed by a processor, cause the processor to perform:

receiving a first set of software libraries and a second set of software libraries;

executing a generative artificial intelligence (GenAI) model on source code and repository descriptions of software libraries from among the first set of software libraries and the second set of software libraries to determine functional intent for the software libraries;

identifying that a first software library from the first set of software libraries and a second software library from the second set of software libraries include a redundant functionality based on corresponding functional intents of the first software library and the second software library;

generating an instruction to pair the first software library and the second software library; and displaying the instruction on a user interface.

19. The non-transitory computer-readable medium of claim 18, wherein the identifying comprises:
identifying that the first software library and the second software library include the redundant functionality based on naming conventions of the first software library and the second software library.

20. The non-transitory computer-readable medium of claim 18, wherein the identifying comprises:
identifying the corresponding functional intents of the first software library and the second software library based on a first source code of the first software library and a second source code of the second software library.

* * * * *